United States Patent
Choi et al.

(10) Patent No.: US 12,075,339 B2
(45) Date of Patent: Aug. 27, 2024

(54) ELECTRONIC DEVICE AND METHOD FOR TRANSMITTING SYSTEM INFORMATION REQUEST IN ELECTRONIC DEVICE

(71) Applicant: SAMSUNG ELECTRONICS CO., LTD., Suwon-si (KR)

(72) Inventors: Jiwon Choi, Suwon-si (KR); Hyeonsoo Kim, Suwon-si (KR); Keonyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 17/586,076

(22) Filed: Jan. 27, 2022

(65) Prior Publication Data

US 2022/0240163 A1    Jul. 28, 2022

Related U.S. Application Data

(63) Continuation of application No. PCT/KR2022/001249, filed on Jan. 24, 2022.

(30) Foreign Application Priority Data

Jan. 28, 2021 (KR) .................. 10-2021-0012054

(51) Int. Cl.
*H04W 48/14* (2009.01)
*H04W 48/10* (2009.01)
*H04W 76/28* (2018.01)

(52) U.S. Cl.
CPC .......... *H04W 48/14* (2013.01); *H04W 48/10* (2013.01); *H04W 76/28* (2018.02)

(58) Field of Classification Search
None
See application file for complete search history.

(56) References Cited

U.S. PATENT DOCUMENTS 11,178,680 B2 * 11/2021 Yang .................. H04W 72/23
11,184,826 B2 * 11/2021 Lee ................... H04W 36/24
(Continued)

FOREIGN PATENT DOCUMENTS

KR    10-2011-0061162    6/2011
KR    10-2012-0026676    3/2012
(Continued)

OTHER PUBLICATIONS

3GPP TSG-RAN, "Design on MSG1 based request and failure handling", Meeting Notes, Meeting #98, May 15-19, 2017, 3 pages.
(Continued)

*Primary Examiner* — Hong S Cho
(74) *Attorney, Agent, or Firm* — Nixon & Vanderhye, P.C.

(57) ABSTRACT

According to various embodiments, an electronic device may comprise: at least one antenna and a communication processor. The communication processor may be configured to: transmit a system information request to a base station through the at least one antenna, identify an electric field state of a reception signal, in response to a failure in the system information request, set a retransmission period of the system information request based on the identified electric field state of the reception signal, and retransmit the system information request based on the set retransmission period of the system information request.

20 Claims, 15 Drawing Sheets

(56) References Cited

U.S. PATENT DOCUMENTS

| | | |
|---|---|---|
| 2012/0063297 A1 | 3/2012 | Hong |
| 2016/0100433 A1 | 4/2016 | Vajapeyam et al. |
| 2016/0128006 A1 | 5/2016 | Ji et al. |
| 2016/0234736 A1 | 8/2016 | Kubota et al. |
| 2020/0053796 A1 | 2/2020 | Agiwal |
| 2020/0113011 A1 | 4/2020 | Peisa et al. |
| 2020/0154513 A1 | 5/2020 | Zhang et al. |
| 2020/0163142 A1 | 5/2020 | Ryoo et al. |
| 2020/0169974 A1 | 5/2020 | Lee et al. |
| 2020/0322878 A1 | 10/2020 | Prabhakar et al. |
| 2021/0058135 A1 | 2/2021 | Jung et al. |
| 2021/0289423 A1 | 9/2021 | He |

FOREIGN PATENT DOCUMENTS

| | | |
|---|---|---|
| KR | 10-2016-0092384 | 8/2016 |
| KR | 10-2017-0066380 | 6/2017 |
| KR | 10-2019-0060813 | 6/2019 |
| KR | 10-2019-0106058 | 9/2019 |
| KR | 10-2020-0037302 | 4/2020 |
| KR | 10-2020-0059531 | 5/2020 |
| WO | 2020/111764 | 6/2020 |

OTHER PUBLICATIONS

3GPP TSG-RAN, "Random access backoff and timers in NR-U", Meeting Notes, Meeting #104, Nov. 12-16, 2018, 3 pages.

Extended European Search Report dated Feb. 27, 2024 issued in European Patent Application No. 22746187.8.

Search Report and Written Opinion issued Apr. 26, 2022 in counterpart International Patent Application No. PCT/KR2022/001249.

Samsung, "On Demand SI Delivery: Signaling Aspects," R2-1700011, Spokane, USA, Jan. 6, 2017, 7 pages.

3GPP; TSG RAN; NR; "Radio Resource Control (RRC) protocol specification," (Release 16), 3GPP; TS 38. 331 V16.3.0. Jan. 6, 2021, 934 pages.

Extended European Search Report dated May 21, 2024 issued in European Patent Application No. 22746187.8.

* cited by examiner

ELECTRONIC DEVICE AND METHOD FOR TRANSMITTING SYSTEM INFORMATION REQUEST IN ELECTRONIC DEVICE

CROSS-REFERENCE TO RELATED APPLICATIONS

This application is a continuation of International Application No. PCT/KR2022/001249 designating the United States, filed on Jan. 24, 2022, in the Korean Intellectual Property Receiving Office and claiming priority to Korean Patent Application No. 10-2021-0012054, filed on Jan. 28, 2021, in the Korean Intellectual Property Office, the disclosures of which are incorporated by reference herein in their entireties.

BACKGROUND

Field

The disclosure relates to an electronic device and a method for transmitting a system information request in an electronic device.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on higher frequency bands (e.g., a band of 25 GHz to 60 GHz) as well as those used for 3G communication systems and long-term evolution (LTE) communication systems.

For example, to mitigate path loss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

To implement 5G communication, stand-alone (SA) and non-stand alone (NSA) schemes are taken into consideration. The SA scheme may be a scheme that uses only the new radio (NR) system, and the NSA scheme may be a scheme that uses the NR system together with the legacy LTE system. In the NSA scheme, user equipment (UE) may use not only eNBs of the LTE system but also gNBs of the NR system. Technology allowing UEs to use heterogeneous communication systems may be termed dual connectivity.

In a communication system (e.g., LTE or 5G), system information (e.g., system information (SI) or system information block (SIB)) may be transmitted in a broadcasting scheme every period set in a network (e.g., a base station). In the case of the broadcasting transmission scheme, the electronic device may receive system information quickly and accurately, but since system information must be continuously transferred in the network, it may be inefficient in terms of radio resources.

For example, the 5G communication system has adopted the on-demand scheme that provides system information when an electronic device sends a request for specific system information to the network. In the 5G communication system, other SIBs other than the master information block (MIB) and system information block 1 (SIB1), which are essential system information, may be provided in an on-demand scheme according to a configuration. When normal reception fails after a system information request (SI request) in the on-demand scheme, the electronic device may retransmit the system information request.

SUMMARY

Embodiments of the disclosure may provide an electronic device capable of setting a period for retransmitting a system information request based on the electric field situation of the electronic device and a method for transmitting a system information request in an electronic device.

According to various example embodiments, an electronic device may comprise: at least one antenna and a communication processor. The communication processor may be configured to: transmit a system information request to a base station through the at least one antenna, identify an electric field state of a reception signal, in response to a failure in the system information request, set a retransmission period of the system information request based on the identified electric field state of the reception signal, and retransmit the system information request based on the set retransmission period of the system information request.

According to various example embodiments, an electronic device may comprise: a memory, at least one antenna, an application processor, and a communication processor. The communication processor may be configured to: receive an event related to an application from the application processor, identify a configuration of system information corresponding to the received event, in response to the reception of the application-related event, transmit a system information request corresponding to the received event to a base station through the antenna based on the system information corresponding to the received event being identified as set as non-broadcast information, and receive the system information from the base station in response to the transmission of the system information request.

According to various example embodiments, a method for operating an electronic device may comprise: transmitting a system information request to a base station through at least one antenna, identifying an electric field state of a reception signal, in response to a failure in the system information request, setting a retransmission period of the system information request based on the identified electric field state of the reception signal, and retransmitting the system information request, based on the set retransmission period of the system information request.

According to various example embodiments, a method for operating an electronic device may comprise: receiving, by a communication processor, an event related to an application from an application processor, identifying a configuration of system information corresponding to the received event, in response to the reception of the application-related event, transmitting a system information request corresponding to the received event to a base station based on the system information corresponding to the received event being identified as set as non-broadcast information, and receiving the system information from the base station in response to the transmission of the system information request.

According to various example embodiments, it is possible to address problems due to a failure to receive a system information request by setting a retransmission period for a system information request considering the current electric field status of the electronic device, paging period, or related application execution operation. For example, according to various example embodiments, it is possible to reduce power consumption in the electronic device by optimizing the retransmission operation for a system information request when a system information request failure occurs and to minimize and/or reduce paging missing issues due to a system information reception failure.

According to various example embodiments, it is possible to increase the network efficiency and prevent and/or reduce unnecessary periodical transmission of SIBs for cells where the electronic device is not currently camping, by transmitting at least one SIB at the request of the electronic device, rather than periodically broadcasting at least one SIB from the network.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
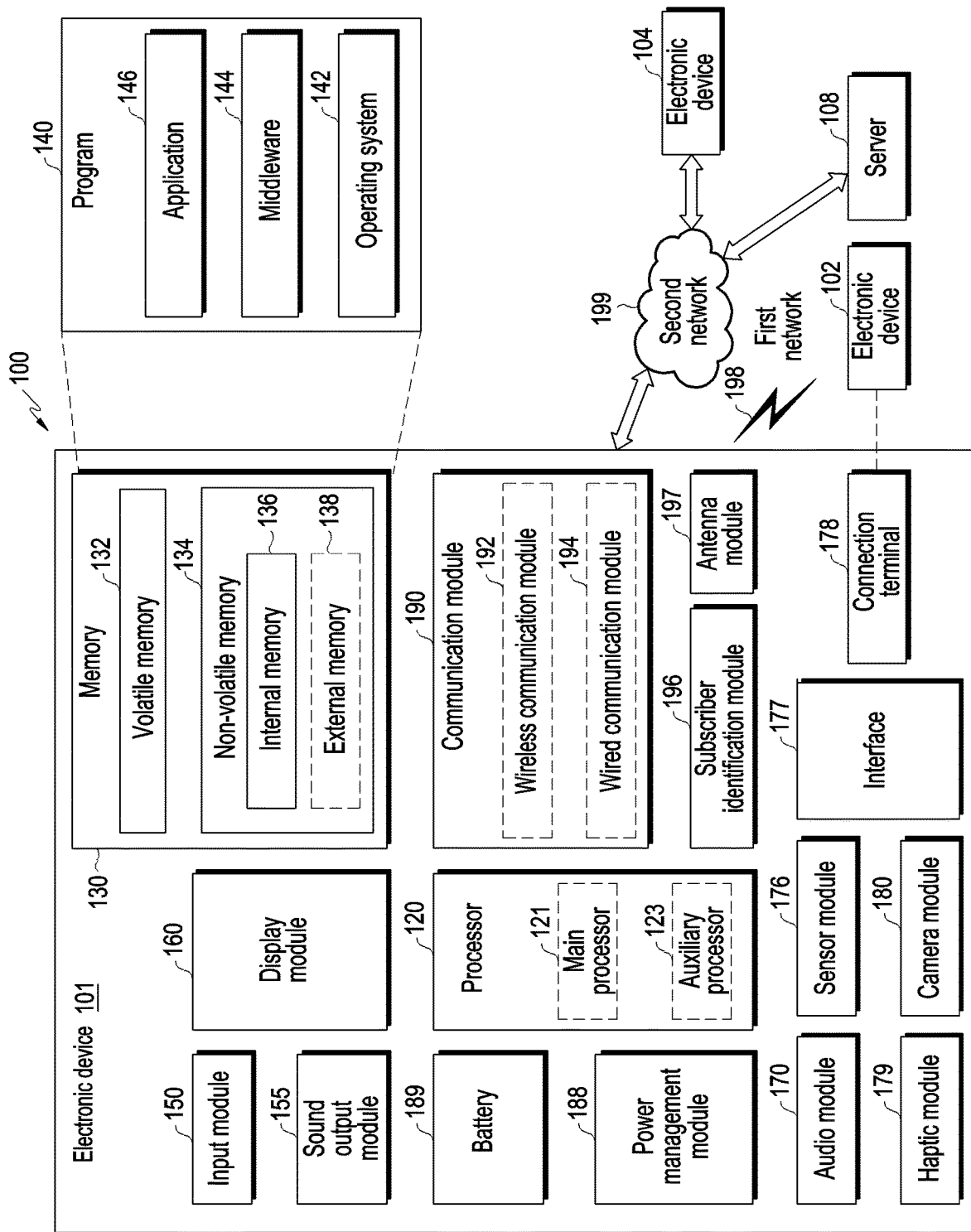
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
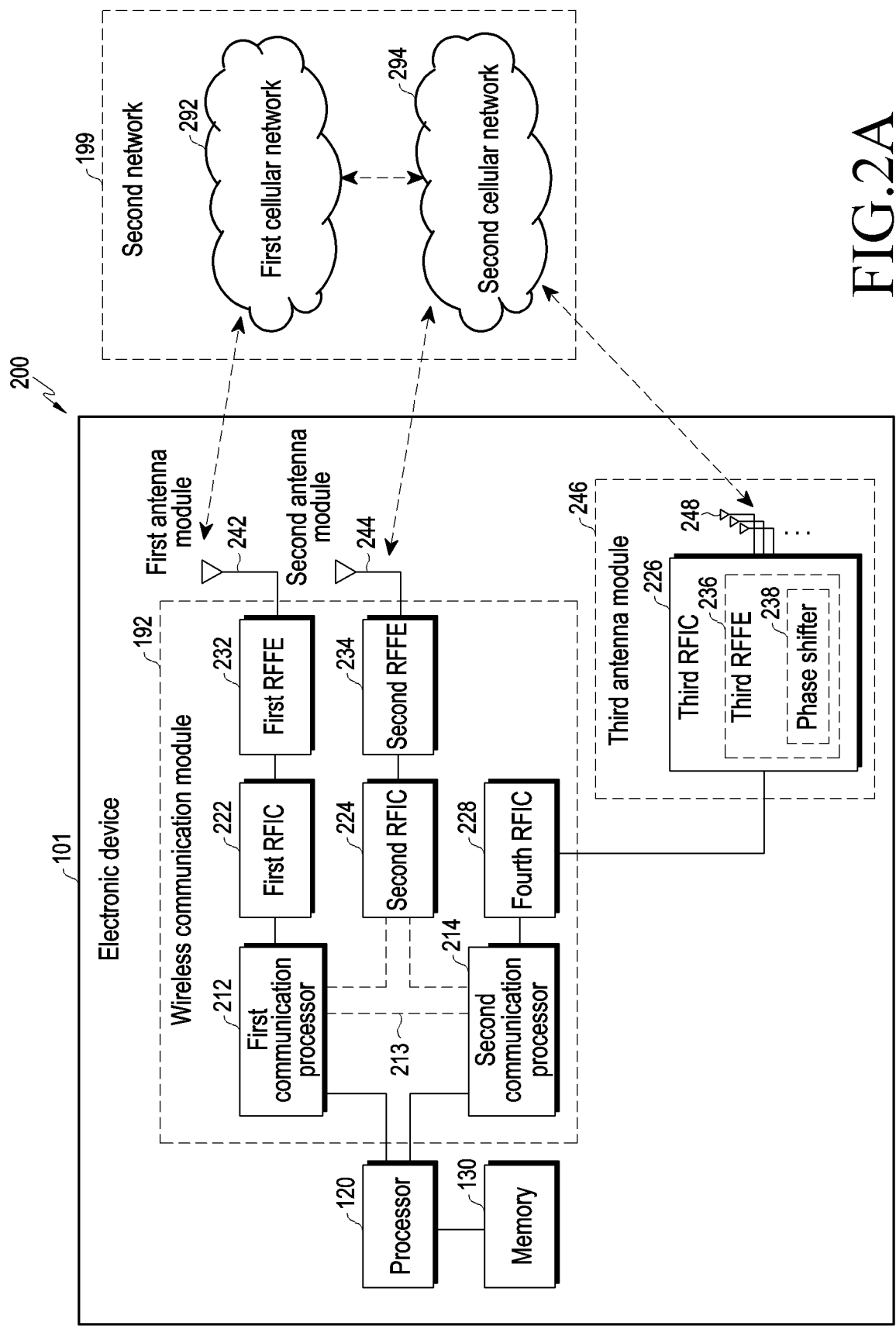
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
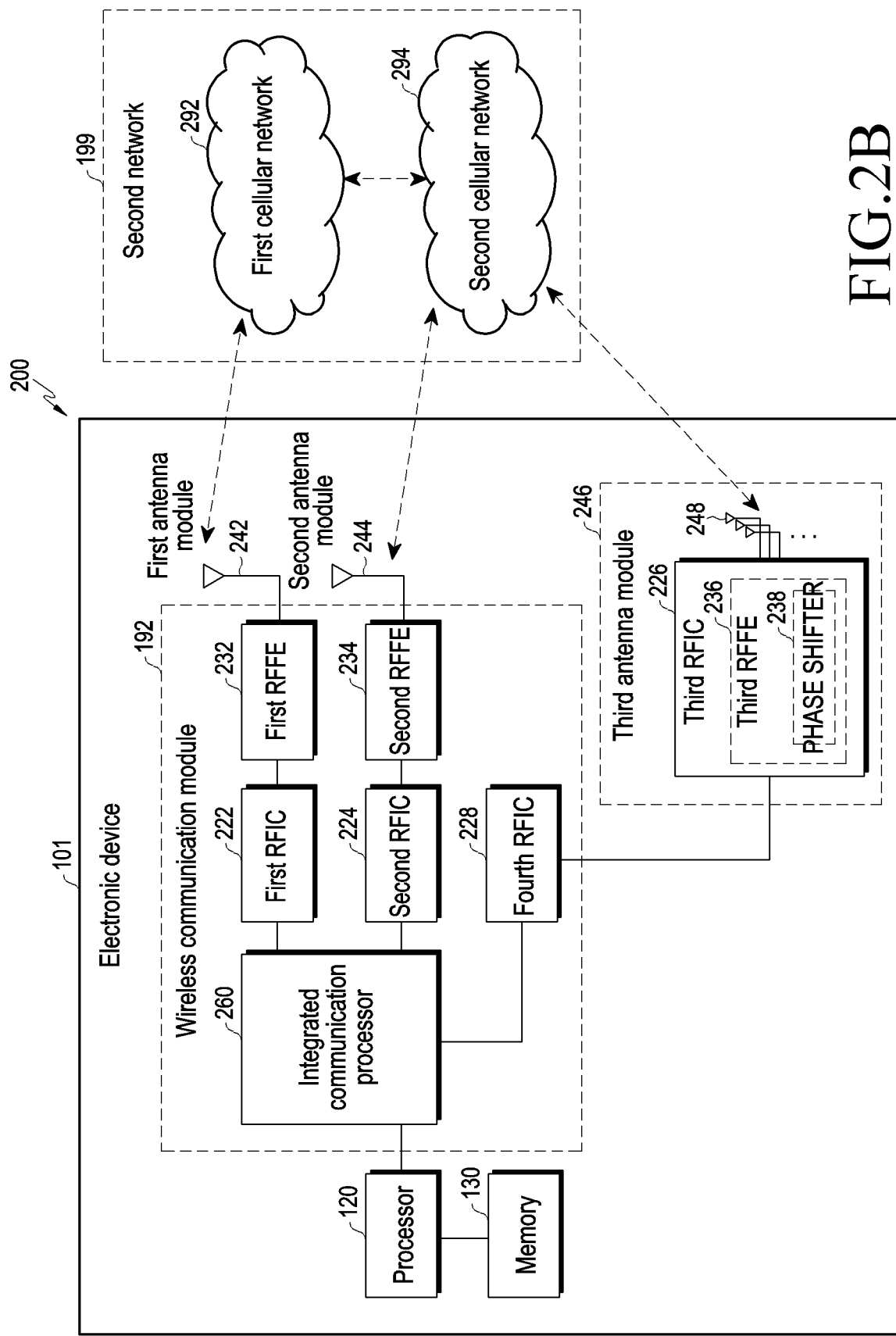
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may include various processing circuitry and support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC may be connected to the first RFFE 232 and the second RFFE 234, and the integrated RFIC may convert a baseband signal into a signal of a band supported by the first RFFE 232 and/or the second RFFE 234 and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Hereinafter, various example methods for receiving system information by an electronic device are described. At least some of the methods for receiving system information to be described below may follow the content set forth in the standard document $3^{rd}$ generation partnership project (3GPP) technical specification (TS) 36.213, 36.331, 38.213, or 38.331, but are not limited thereto. The term "system information" used in the following description is not limited to system information of a specific technology or a specific type and, as an example thereof, master information block (MIB) and/or system information block (SIB) is described.

According to various embodiments, the electronic device may synchronize with a cell (or base station) through a configured cell search procedure, obtain a physical layer ID, and find cell frame synchronization. When the electronic device synchronizes with the cell, it may obtain system information for the corresponding cell. At least part of the cell system information may be repeatedly broadcast by the network. The system information for the cell may include downlink and uplink cell bandwidth, downlink/uplink configuration in the case of time division duplexing (TDD), detailed parameters related to random access, or uplink power control information.

According to various embodiments, the system information may be transmitted in different schemes through different channels. For example, system information referred to as MIB may be transmitted using a broadcast channel (BCH). A main part of a plurality of different system information referred to as SIB may be transmitted using a downlink-shared channel (DL-SCH). For example, the presence or absence of system information on the DL-SCH in the subframe may be identified by a corresponding physical downlink control channel (PDCCH) indicated by a specific system information radio network temporary identifier (RNTI) (SI-RNTI). The corresponding PDCCH may include information regarding a transmission format and physical resources (e.g., resource blocks) used for system information.

According to various embodiments, the SIB in the LTE communication system may include the following types of system information. At least part of the content related to the SIB of the LTE communication system to be described below may be included in the same or similar manner in the 5G communication system.

SIB1: may include related information depending on whether the electronic device may use the corresponding cell. For example, it may include operator information for the corresponding cell and information related to restrictions when a specific user accesses the corresponding cell. When configured in TDD, it may include information about the configuration of a specific frame and allocation of a subframe for downlink/uplink. It may include information about scheduling in the time domain of other SIBs (e.g., SIB2, SIB3, . . . SIB20) than SIB1 (hereinafter, referred to as "system information (SI) scheduling information").

SIB2: may include information necessary for the electronic device to access the corresponding cell. For example, it may include uplink cell bandwidth (bandwidth), random access parameters, information for parameters related to uplink power control, information related to access restrictions on the cell, and multicast broadcast single frequency network (MBSFN) configuration information.

SIB3: may include information related to cell-reselection.

SIB4 to SIB8: may include information about a neighbor cell on the same carrier as the corresponding cell (intra frequency neighbor cell), a neighbor cell on a different carrier (inter frequency neighbor cell), and a neighbor cell, which is not an LTE cell, (e.g., WCDMA/HSPA, GSM, or CDMA2000 cell).

SIB9: may include the name of the home eNodeB.

SIB10 to SIB12: may include public information (public warning) messages (e.g., earthquake and tsunami warning system (ETWS), commercial mobile alert service (CMAS) information).

SIB13: may include information necessary for multimedia broadcast multicast services (MBMS) reception.

SIB14: may be used to support enhanced access barring and may include information necessary for controlling the electronic device to access the cell.

SIB15: may include information necessary for MBMS reception of adjacent carrier frequencies.

SIB16: may include global positioning system (GPS) time and coordinated universal time (UTC)-related information.

SIB17: may include information regarding interworking between LTE and WLAN.

SIB18, SIB19: may include information regarding the sidelink for direct communication between electronic devices.

SIB20: may include information related to single cell point-to-multipoint.

The base station may not transmit at least some of the SIBs as necessary. For example, SIB9 may not be transmitted when the user establishes a home eNodeB, and SIB13 may not be transmitted when the MBMS service is not provided. The MIB or at least some SIBs may be repeatedly broadcast according to a set period. How often a particular SIB is transmitted may depend on how quickly the electronic device obtains the system information when it enters the cell. For example, a lower-numbered SIB may be configured to be transmitted more frequently as more time-sensitive information than a higher-numbered SIB. For example, SIB1 may be transmitted every 80 ms, and for SIBs (e.g., SIB2 to SIB20) having a higher number than SIB1, various transmission periods which are relatively longer may be set. For example, the transmission period of SIB2 may be set to 160 ms, the transmission period of SIB3, SIB4 or SIB5 may be set to 320 ms, and the transmission period of SIB6, SIB7, or SIB8 may be set to 640 ms. The transmission period of the SIBs may be variously changed and set by the network operator.

According to various embodiments, different SIBs may be mapped to different system information (SI) messages corresponding to actual transport blocks transmitted on the DL-SCH. For example, SIB1 may be mapped to SI-1, which is the first SI message, and the other SIBs may be grouped into the same SI and multiplexed under certain constraints. For example, SIB2 may be mapped to SI-2, SIB3 and SIB4 may be mapped to SI-3, SIB5 may be mapped to SI-4, and SIB6, SIB7, and SIB8 may be mapped to SI-5. The mapping relationship between the SIB and the SI may differ for each network, and they may differ even within the same network.

According to various embodiments, different SIs may have different transmission periods. In the following description, the transmission period of each SI may be referred to as an "SI period". Each SI may be transmitted in any slot or subframe within a time window having a predefined start point and duration. In the following description, the time window during which the SI may be transmitted may be referred to as an "SI window." The start point and duration of the time window for each SI may be provided through SIB1. Each SI may be transmitted on contiguous slots or subframes within the corresponding SI window or may be transmitted on incontiguous subframes. Whether system information exists within the configured SI window may be identified by the SI-RNTI on the PDCCH as described above. The PDCCH may provide scheduling information in the frequency domain along with other parameters related to system information transmission. According to various embodiments, different time windows that do not overlap each other may be allocated to different SIs. Although the electronic device cannot identify the identifier for each SI, it may identify which SI is received through the corresponding time window. According to various embodiments, the electronic device supporting CA may identify system information regarding a secondary component carrier (SCC) from system information regarding a primary component carrier (PCC).

As a comparative example of the system information for the LTE communication system, the system information for the 5G communication system may be configured as follows. In the 5G communication system, the MIB may be transmitted through the PBCH, and the PBCH may be transmitted by forming a synchronization signal block (SS block) together with a primary synchronization sequence (PSS) and secondary synchronization (SSS). In relation to SIB1, the PBCH in the SS block may include a numerology of SIB1 and a configuration of SIB1. The MIB transmitted through the PBCH may be configured as shown in Table 1 below, but is not limited thereto.

TABLE 1

```
MIB ::= SEQUENCE {
    systemFrameNumber        BIT STRING (SIZE (6)),
    subCarrierSpacingCommon  ENUMERATED {scs15or60, scs30or120},
    ssb-SubcarrierOffset     INTEGER (0..15),
    dmrs-TypeA-Position      ENUMERATED {pos2, pos3},
    pdcch-ConfigSIB1         INTEGER (0..255),
    cellBarred               ENUMERATED {barred, notBarred},
    intraFreqReselection     ENUMERATED {allowed, notAllowed},
    spare                    BIT STRING (SIZE (1))
}
```

Referring to Table 1, the MIB may include a system frame number (SFN), SIB1, subcarrier spacing of message 2 or 4 of random access, SSB subcarrier offset, downlink demodulation reference signal (DMRS) position information, PDCCH configuration information for SIB1, cell restriction, or whether intra frequency reselection is allowed.

According to various embodiments, the numerology of SIB1 may include information regarding subcarrier spacing used for transmission of SIB1. According to various embodiments, the numerology of SIB1 may be equally used for message 2 (Msg 2) and message 4 (Msg 4) in the random access procedure. The configuration of SIB1 may include information regarding parameters related to PDCCH required for cell search and monitoring of scheduling of SIB1 (e.g., PDCCH/SIB bandwidth, CORESET, common search space, PDCCH parameters).

According to various embodiments, SIB1 may be referred to as remaining minimum system information (RMSI) and may include system information that the electronic device needs to know before accessing the system. The SIB1 may be periodically broadcast for the entire cell area. The SIB1 may include information necessary for initial random access. For example, SIB1 may be transmitted by a physical downlink shared channel (PDSCH) scheduled at a period of 160 ms. The PBCH/MIB may include a search space used for scheduling of SIB1 and a control resource set (CORESET) corresponding thereto along with information regarding the numerology used for transmission of SIB1. In the CORESET, the electronic device may monitor scheduling of SIB1 indicated by SI-RNTI.

According to various embodiments, SIBs other than SIB1 may include system information that the electronic device does not need to know before accessing the cell, and it may be periodically broadcast similarly to the above SIB1 or may be transmitted only when necessary. For example, SIBs other than SIB1 may be transmitted at the request of at least one electronic device in the corresponding cell. As the other SIBs than SIB1 are transmitted at the request of the electronic device, it is possible to increase the network efficiency and prevent and/or reduce unnecessary periodical transmission of SIBs for cells where the electronic device is not currently camping. The scheme of providing system information (e.g., a corresponding SIB) when the electronic device sends a request for specific system information to the network, rather than always broadcasting SIBs may be referred to as an "on-demand scheme." For example, SIBs other than MIB and system information block 1 (SIB1), which are essential system information, may be provided in a broadcasting scheme or the on-demand scheme according to configuration. When normal reception fails after a system information request (SI request) (hereinafter, "system information request (SI request)") in the on-demand scheme, the electronic device may retransmit the system information request. As compared to the above-described LTE communication system, SIBs in the 5G communication system may include the following types of system information.

SIB1: SIB1 may be transmitted through DL-SCH, e.g., at a period of 160 ms. SIB1 may include availability of other SIBs and scheduling-related information (e.g., periodicity, SI window size). SIB1 may include information indicating whether other SIBs are periodically broadcast or transmitted in an on-demand scheme. SIB1 may include information for the electronic device to perform an SI request.

SIB2: may include information related to cell-reselection.

SIB3: may include a neighbor ell on the same carrier in NR and information related to cell reselection.

SIB4: may include information for a neighbor cell on a different carrier in NR and information related to cell reselection.

SIB5: may include LTE neighbor cell information and information related to cell reselection.

SIB6 to SIB8: may include public information (public warning) messages (e.g., earthquake and tsunami warning system (ETWS), commercial mobile alert service (CMAS) information).

SIB9: may include GPS time information and coordinated universal time (UTC)-related information.

According to various embodiments, the SIBs in the 5G communication system may further include other system information (e.g., system information required for MBMS reception) in addition to the SIB1 to SIB9.

Hereinafter, various example methods for receiving system information by an electronic device are described in greater detail below with reference to FIGS. 3 to 10.

Figure 3:
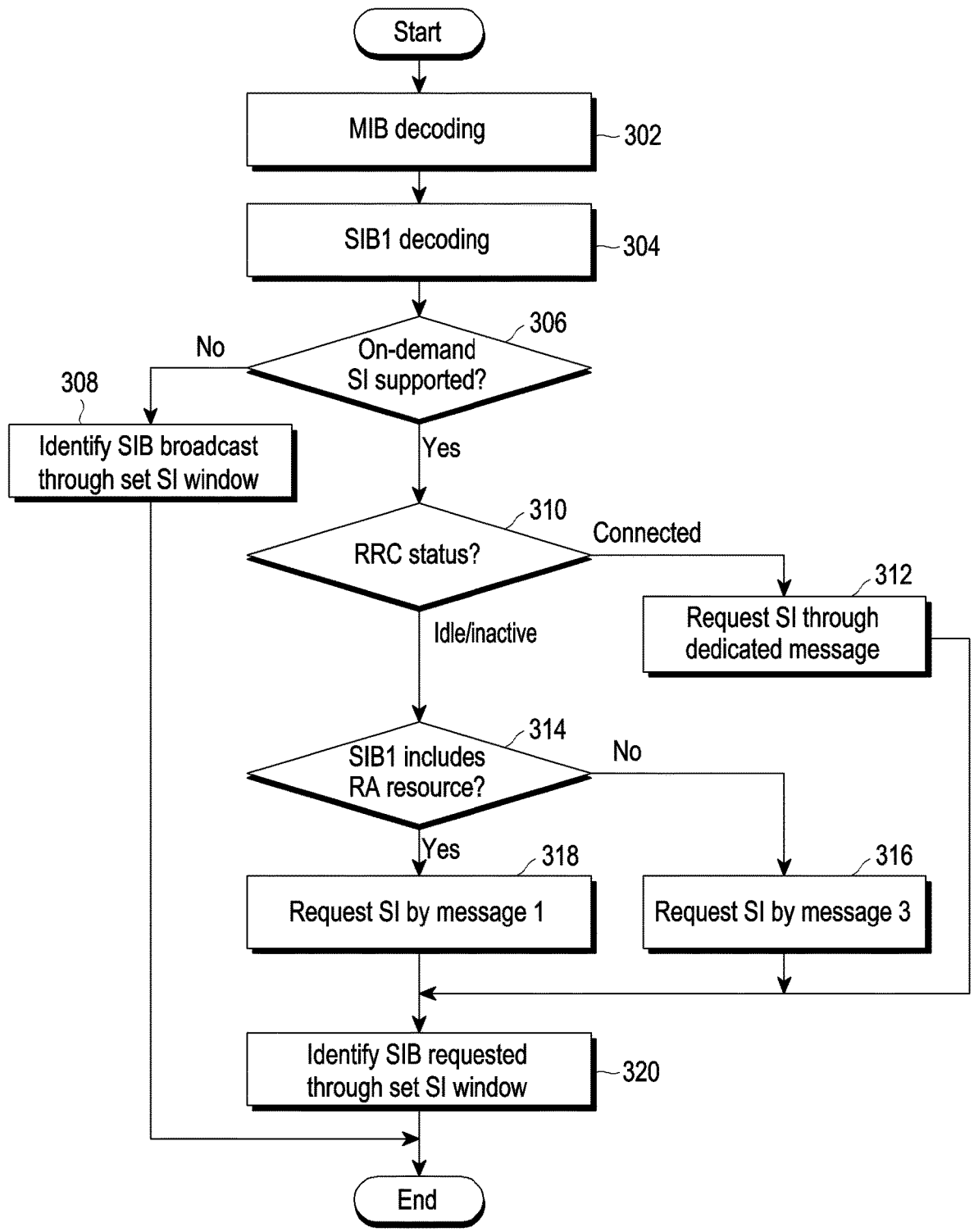
FIG. 3 is a flowchart illustrating an example method for receiving system information by an electronic device according to various embodiments.

FIG. 3 is a flowchart illustrating an example method for receiving system information by an electronic device according to various embodiments. According to various embodiments, an electronic device (e.g., the electronic device 101 of FIG. 1) may synchronize with a cell (or base station) through a configured cell search procedure, obtain a physical layer ID, and find cell frame synchronization. When the electronic device synchronizes with the cell, it may obtain system information for the corresponding cell. The cell system information may be repeatedly broadcast by the network. The system information for the cell may include downlink and uplink cell bandwidth, downlink/uplink configuration in the case of time division duplexing (TDD), detailed parameters related to random access, or uplink power control information.

Referring to FIG. 3, according to various embodiments, the electronic device (e.g., the electronic device 101 of FIG. 1) (e.g., the wireless communication module 192, the first communication processor 212, the second communication processor 214, or the integrated communication processor 260) may decode the MIB in operation 302. For example, as described above in connection with Table 1, the MIB may include a system frame number (SFN), SIB1, subcarrier spacing of message 2 or 4 of random access, SSB subcarrier offset, downlink demodulation reference signal (DMRS) position information, PDCCH configuration information for SIB1, cell restriction, or whether intra frequency reselection is allowed.

According to various embodiments, the numerology of SIB1 may include information regarding subcarrier spacing used for transmission of SIB1. According to various embodiments, the numerology of SIB1 may be equally used for message 2 (Msg 2) and message 4 (Msg 4) in the random access procedure. The configuration of SIB1 may include information regarding parameters related to PDCCH required for cell search and monitoring of scheduling of SIB1 (e.g., PDCCH/SIB bandwidth, CORESET, common search space, PDCCH parameters).

According to various embodiments, in operation 304, the electronic device may decode SIB1 based on information included in the MIB. As described above, the SIB1 may be referred to as remaining minimum system information (RMSI) and may include system information that the electronic device needs to know before accessing the system. The SIB1 may be periodically broadcast for the entire cell area. The SIB1 may include information necessary for initial random access. For example, SIB1 may be transmitted by a physical downlink shared channel (PDSCH) scheduled at a period of 160 ms. The PBCH/MIB may include a search space used for scheduling of SIB1 and a control resource set (CORESET) corresponding thereto along with information regarding the numerology used for transmission of SIB1. In the CORESET, the electronic device may monitor scheduling of SIB1 indicated by SI-RNTI.

According to various embodiments, SIBs other than SIB1 may include system information that the electronic device does not need to know before accessing the cell, and it may be periodically broadcast similarly to the above SIB1 or may be transmitted only when necessary. For example, SIBs other than SIB1 may be transmitted at the request of at least one electronic device in the corresponding cell. The scheme of providing system information (e.g., a corresponding SIB) when the electronic device sends a request for specific system information to the network, rather than always broadcasting SIBs may be referred to as an "on-demand scheme." For example, SIBs other than MIB and system information block 1 (SIB1), which are essential system information, may be provided in the on-demand scheme according to configuration.

According to various embodiments, in operation 306, the electronic device may identify whether the on demand is supported for the system information through the SIB1. For example, whether the on-demand is supported may be identified through information included in SIB1 of Table 2 below.

TABLE 2

```
message c1 : systemInformationBlockType1 :
si-SchedulingInfo
  {
    schedulingInfoList
    {
      {
        si-BroadcastStatus broadcasting, // sib2 is broadcast
        si-Periodicity rf32,
        sib-MappingInfo
        {
          {
            type sibType2,
            valueTag 0
          }
        }
      },
      {
        si-BroadcastStatus notBroadcasting, // sib3 uses on-demand
        si-Periodicity rf64,
        sib-MappingInfo
        {
          {
            type sibType3,
            valueTag 1
          }
        }
      }
    }
  },
```

Referring to Table 2, when the broadcast status information (si-BroadcastStatus) of a specific SIB in the system information (SI) scheduling information (si-SchedulingInfo) in SIB1 is set to "broadcasting", the corresponding SIB may be broadcast and, when it is set to "not Broadcasting", the corresponding SIB may be provided by the electronic device requesting the corresponding SIB by the on-demand scheme. For example, in Table 2, it may be identified that SIB2 is set as a broadcast SIB and that SIB3 is set as a non-broadcast SIB (e.g., an SIB provided by the on-demand scheme). According to various embodiments, according to Table 2, the SI period (si-Periodicity) of SIB2 may be set to 320 ms, and the SI period of SIB3 may be set to 640 ms.

According to various embodiments, when it is identified in operation 306 that a specific SIB is set as a broadcast SIB and on-demand SI is not supported (No in operation 306), the electronic device may identify the SIB broadcast through a set SI window in operation 308. Hereinafter, a method for identifying the broadcast SIB by an electronic device is described with reference to FIGS. 4 and 5.

Figure 4:
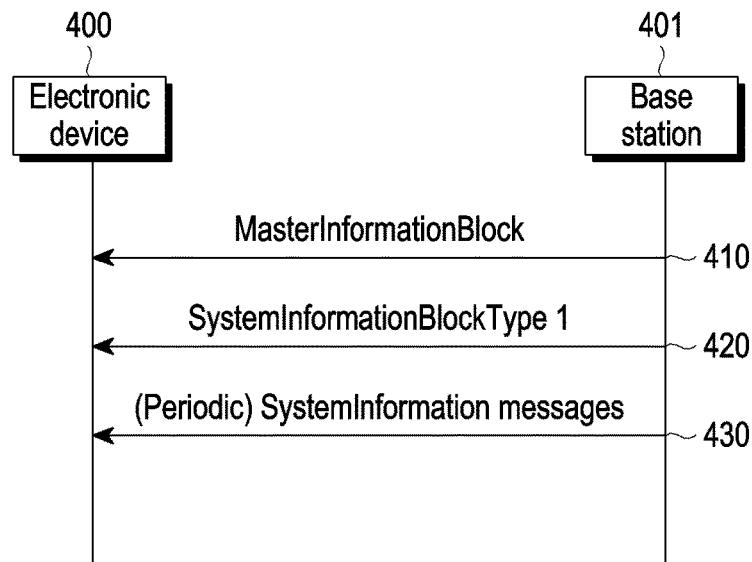
FIG. 4 is a signal flow diagram illustrating an example method for receiving system information from a base station by an electronic device according to various embodiments.
Figure 5:
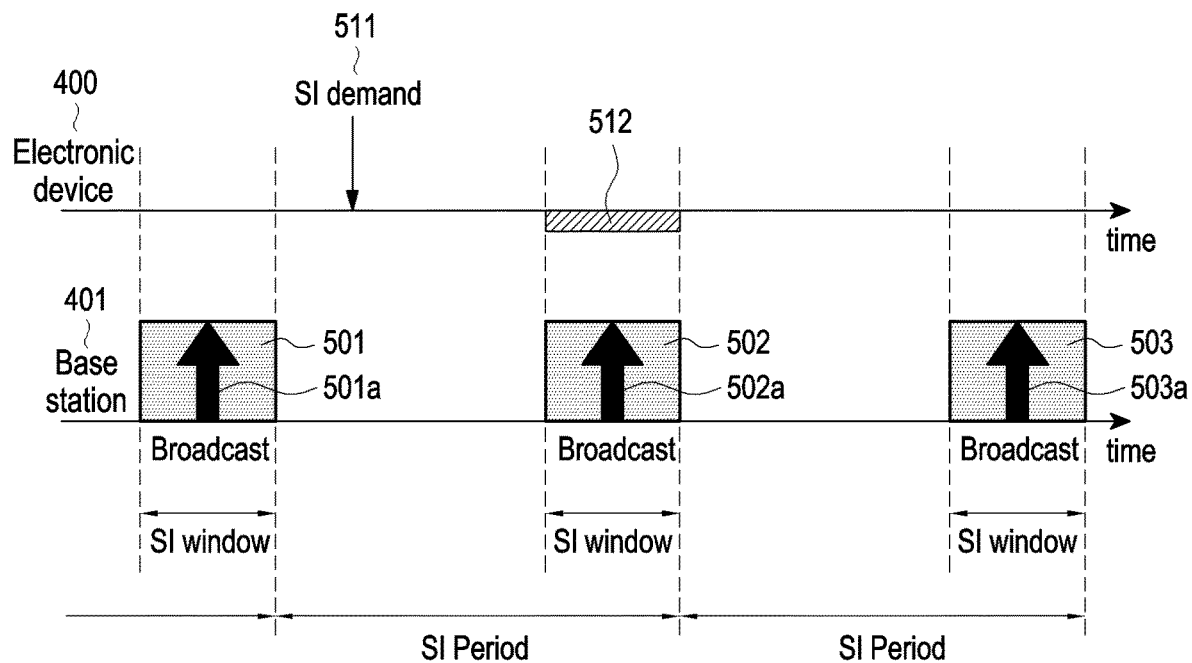
FIG. 5 is a diagram illustrating example timing of transmitting system information from a base station according to various embodiments.

FIG. 4 is a signal flow diagram illustrating an example method for receiving system information from a base station by an electronic device according to various embodiments. FIG. 5 is a diagram illustrating example timing of transmitting system information from a base station according to various embodiments. Referring to FIGS. 4 and 5, an electronic device 400 (user equipment (UE)) (e.g., the electronic device 101 of FIG. 1) may receive and decodes an MIB from a base station 401 (e.g., eNB or gNB) in operation 410. The electronic device 400 may receive and decode SIB1 with reference to information included in the received MIB in operation 420. In operation 430, the electronic device 400 may receive other periodically transmitted SIBs (e.g., SIB2, SIB3, . . . , or SIB20) with reference to the information included in the received SIB1.

Referring to FIG. 5, a specific SIB broadcast from the base station 401 may be broadcast within an SI window every SI period set as illustrated. According to various embodiments, as described above, at least one SIB may be grouped into one SI message and multiplexed. The same SI period and SI window may be set for each SI message, but the disclosure is not limited thereto. In the following description, for convenience of description, it is described that a specific SI message or a specific SIB is transmitted within one SI window. For example, the base station 401 may transmit a corresponding SIB 501a within a first SI window 501 in a first SI period, transmit a corresponding SIB 502a within a second SI window 502 in a second SI period, and transmit a corresponding SIB 503a within a third SI window 503 in a third SI period. As described above, the SI period and/or the SI window may be configured for each SIB or for each SI message mapped to each SIB. For example, the SI period may be set to 320 ms (32 radio frames (RF)), and the size of the SI window may be set to 80 slots (e.g., 40 ms when SCS is 30 kHz). Information about the SI period and/or SI window may be included in SIB1 as shown in Table 2 and Table 3 below and transmitted.

TABLE 3

```
SIB1 ::= SEQUENCE {
...
  si-SchedulingInfo SI-SchedulingInfo OPTIONAL, -- Need R
  servingCellConfigCommon ServingCellConfigCommonSIB OPTIONAL, -- Need R
...
ServingCellConfigCommonSIB ::= SEQUENCE {
  downlinkConfigCommon DownlinkConfigCommonSIB,
  uplinkConfigCommon UplinkConfigCommonSIB OPTIONAL, -- Need R
  supplementaryUplink UplinkConfigCommonSIB OPTIONAL, -- Need R
  n-TimingAdvanceOffset ENUMERATED { n0, n25560, n39936 } OPTIONAL, -- Need S
  ssb-PositionsInBurst SEQUENCE {
    inOneGroup BIT STRING (SIZE (8)),
    groupPresence BIT STRING (SIZE (8)) OPTIONAL -- Cond Above6GHzOnly
  },
...
DownlinkConfigCommonSIB ::= SEQUENCE {
  frequencyInfoDL FrequencyInfoDL-SIB,
  initialDownlinkBWP BWP-DownlinkCommon,
  bcch-Config BCCH-Config,
  pcch-Config PCCH-Config,
...
}
...
```

TABLE 3-continued

```
BWP-DownlinkCommon ::= SEQUENCE {
  genericParameters BWP,
  pdcch-ConfigCommon SetupRelease { PDCCH-ConfigCommon }
  pdsch-ConfigCommon SetupRelease { PDSCH-ConfigCommon }
  ...
}
...
PDCCH-ConfigCommon ::= SEQUENCE {
  commonControlResourcesSets SEQUENCE (SIZE(1..2)) OF ControlResourceSet,
  commonSearchSpaces SEQUENCE (SIZE(1..4)) OF SearchSpace,
  searchSpaceSIB1 SearchSpaceId OPTIONAL,
  searchSpaceOtherSystemInformation SearchSpaceId OPTIONAL,
  pagingSearchSpace SearchSpaceId OPTIONAL,
  ra-ControlResourceSet ControlResourceSetId OPTIONAL,
  ra-SearchSpace SearchSpaceId OPTIONAL,
  ...
}
```

For example, referring to Table 3, SIB1 may include position information (e.g., search space information) of other SIBs than SIB1 in the serving cell configuration common SIB information (ServingCellConfig CommonSIB).

Referring back to FIG. 5, when the electronic device 400 identifies at least one SIB configured to be broadcast after decoding SIB1, the electronic device 400 may identify the SI period and SI window of the corresponding SIB using information included in Table 3 above. In the disclosure, a situation in which an electronic device requires a SIB other than SIB1 will be referred to as "SI demand". For example, the electronic device 400 may identify at least one SIB being broadcast through SIB1 and determine that a demand 511 for the corresponding SI has occurred. According to various embodiments, the demand for the SI may be determined to have occurred when the SI configuration information is changed after the SIB1 message first received is stored.

The electronic device 400 may monitor (512) the corresponding SI or corresponding SIB 502a transmitted through the first arriving SI window 502 or the SI window 502 in the corresponding SI period when the at least one SIB is being broadcast according to the demand 511 for the SI. If decoding the corresponding SIB 502a fails as a result of the monitoring (e.g., when decoding of the corresponding SIB fails), the electronic device 400 may monitor the corresponding SI or corresponding SIB 503a transmitted through the SI window 503 in the next SI period.

Referring back to FIG. 3, when it is identified in operation 306 that the specific SIB is set as a non-broadcast SIB and the on-demand SI is supported (Yes in operation 306), the electronic device 101 may obtain it by transmitting an SI request corresponding to the corresponding SI or SIB to the base station according to the on-demand scheme, according to various embodiments.

Figure 6:
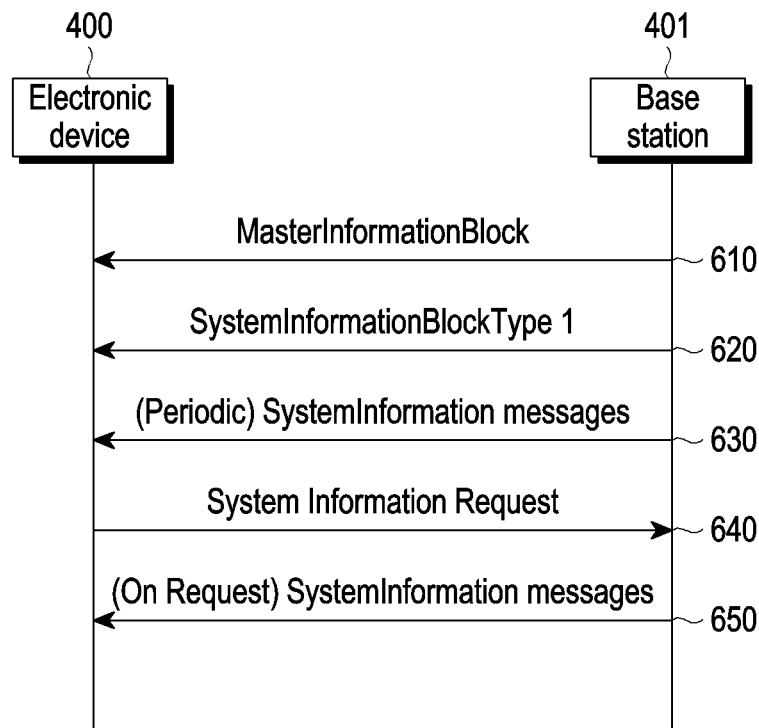
FIG. 6 is a signal flow diagram illustrating an example method for receiving system information from a base station by an electronic device according to various embodiments.

FIG. 6 is a signal flow diagram illustrating an example method for receiving system information from a base station by an electronic device according to various embodiments. Referring to FIG. 6, in operation 610, the electronic device 400 may receive the MIB from the base station 401 (e.g., gNB) and decode the MIB. The electronic device 400 may decode SIB1 transmitted from the base station 401 according to the information included in the MIB in operation 620. According to various embodiments, the electronic device 400 may decode the remaining SIBs periodically broadcast by the base station in operation 630. Since operations 610 to 630 are identical or similar to operations 410 to 430 of FIG. 4 described above, detailed description thereof may not be repeated below.

According to various embodiments, the electronic device 400 may transmit, to the base station 401, an SI request for a counterpart SIB set as a non-broadcast SIB configured in SIB1 in operation 640. The base station 401 may transmit the SI or SIB corresponding to the transmitted SI request to the electronic device 400 in operation 650. Detailed procedures for operations 640 and 650 are described in greater detail below with reference to FIGS. 7 to 10.

According to various embodiments, the electronic device 101 may transmit an SI request in a different scheme according to the RRC status. According to various embodiments, in operation 310, the electronic device 101 may identify the RRC status. As a result of the identification in operation 310, if the RRC status is identified as the RRC_CONNECTED status (operation 310—CONNECTED), the electronic device 101 may transmit an SI request to the base station through a dedicated message in operation 312. For example, the dedicated message for the SI request may include a "DedicatedSIBRequest" message included in the standard document 3GPP TS 38.331, but it is not limited thereto. According to various embodiments, the "DedicatedSIBRequest" message may include a requested SIB list (requestedSIB-List) on the on-demand SIB request list (onDemandSIB-RequestList) to indicate the SIB to be requested.

As a result of the identification in operation 310, if the RRC status is identified as the RRC_IDLE or RRC_INACTIVE status (operation 310—IDLE/INACTIVE), the electronic device 101 may transmit, to the base station, an SI request through message 1 or message 3 of random access (RA) message depending on whether SIB1 includes a random access resource as described below. According to various embodiments, if the RRC status is identified as the RRC_IDLE or RRC_INACTIVE status as a result of the identification in operation 310 (operation 310—IDLE), the electronic device 101 may identify whether SIB1 includes an RA resource in operation 314. As a result of the identification in operation 314, when the RA resource is included in SIB1 (Yes in operation 314), the electronic device 101 may transmit, to the base station, an SI request by message 1 (Msg1) among messages corresponding to the random access procedure in operation 318. As a result of the identification in operation 314, when the RA resource is not included in SIB1 (No in operation 314), the electronic device 101 may transmit, to the base station, an SI request by message 3 (Msg3) among the messages corresponding to the random access procedure in operation 316. According to various embodiments, upon receiving the SI request transmitted by message 1 or message 3 among the messages corresponding to the random access procedure, the base station may transmit corresponding SI or corresponding SIB through a corresponding SI window of a corresponding SI period. In operation 320, the electronic device 101 may identify the requested SI or SIB through the configured (e.g., set) SI window.

Hereinafter, a method for transmitting an SI request using a message corresponding to a random access procedure by an electronic device and identifying corresponding SI or SIB by the electronic device is described in greater detail below with reference to FIGS. 7, 8, 9, and 10.

For example, the electronic device 101 may transmit, to the base station 401, an SI request for a corresponding SIB through message 1 (Msg1) or message 3 (Msg3) among messages included in a random access procedure. The random access procedure may include four steps or two steps. For example, as a first step of the random access procedure, the electronic device may transmit a preamble, referred to as a physical random access channel (PRACH), to the base station. As a second step of the random access procedure, the base station may transmit a random access response (RA response, RAR) to the electronic device in response to the transmission of the PRACH. The RAR indicates normal reception of the preamble and may include a timing-alignment command for adjusting the transmission timing of the UE based on the timing of the preamble received from the electronic device. As a third step of the random access procedure, the electronic device may transmit message 3 (Msg3) to the base station. The random access procedure may be terminated by the base station transmitting message 4 (Msg4) to the electronic device. When transmitting message 3, the electronic device may transmit a necessary message using an uplink-shared channel (UL-SCH) resource allocated in the RAR.

When the random access procedure is normally completed, the electronic device may be switched to the RRC_CONNECTED status. The random access procedure may be performed when the electronic device initially accesses the cell. Further, it may also be used upon handover to another cell, when uplink synchronization is lost, or when uplink scheduling is requested because there is no configuration of a scheduling request resource exclusively allocated to the electronic device.

According to various embodiments, as described above, in operation 314, the electronic device 101 may identify whether a random access resource (RA) is included in SIB1. For example, the RA resource included in SIB1 may be included and configured in the SI scheduling information (SI-SchedulingInfo) as shown in Table 4 below.

TABLE 4

```
SI-SchedulingInfo ::= SEQUENCE {
    schedulingInfoList SEQUENCE (SIZE (1..maxSI-Message)) OF SchedulingInfo,
    si-WindowLength ENUMERATED {s5, s10, s20, s40, s80, s160, s320, s640, s1280},
    si-RequestConfig SI-RequestConfig OPTIONAL, -- Cond MSG-1
    si-RequestConfigSUL SI-RequestConfig OPTIONAL, -- Cond SUL-MSG-1
    systemInformationAreaID BIT STRING (SIZE (24)) OPTIONAL, -- Need R
    ...
}
SI-RequestConfig::= SEQUENCE {
    rach-OccasionsSI SEQUENCE {
        rach-ConfigSI RACH-ConfigGeneric,
        ssb-perRACH-Occasion ENUMERATED {oneEighth, oneFourth, oneHalf, one, two,
four, eight, sixteen}
    } OPTIONAL, -- Need R
    si-RequestPeriod ENUMERATED {one, two, four, six, eight, ten, twelve, sixteen}
OPTIONAL,
    si-RequestResources SEQUENCE(SIZE (1..maxSI-Message)) OF SI-RequestResources
}
SI-RequestResources ::= SEQUENCE {
    ra-PreambleStartIndex INTEGER (0..63),
    ra-AssociationPeriodIndex INTEGER (0..15) OPTIONAL, -- Need R
    ra-ssb-OccasionMaskIndex INTEGER (0..15) OPTIONAL -- Need R
}
```

For example, as shown in Table 4, the RA resource may be included in the SI scheduling information of SIB1. In Table 4, "rach-OccasionsSI" may indicate a random access occasion for specific SI. For example, to transmit an SI request, the electronic device may transmit a random access preamble to the base station in a time interval corresponding to the random access occasion. Upon receiving the random access preamble transmitted in the time interval corresponding to the configured random access occasion, the base station may determine that the received random access preamble is an SI request for corresponding SI or a corresponding SIB by identifying the random access occasion corresponding to the time when the random access preamble is received. For example, the RA resource may be included in the configuration information (si-RequestConfig) as shown in Table 5 below.

TABLE 5

```
// NW -> UE : SIB1
    si-RequestConfig
    {
        rach-OccasionsSI
        {
            rach-ConfigSI
            {
                prach-ConfigurationIndex 160,
                msg1-FDM four,
                msg1-FrequencyStart 0,
                zeroCorrelationZoneConfig 15,
                preambleReceivedTargetPower –118,
                preambleTransMax n7,
                powerRampingStep dB4,
                ra-ResponseWindow sl20
            },
            ssb-perRACH-Occasion one
        },
        si-RequestPeriod two,
```

TABLE 5-continued

```
si-RequestResources
{
    {
        ra-PreambleStartIndex 52,
        ra-AssociationPeriodIndex 0,
        ra-ssb-OccasionMaskIndex 0
    }
  }
},
```

Referring to Table 5, it may be shown that the PRACH configuration index (prach-configurationIndex) is set to 160 and that the random access preamble start index (ra-PreambleStartIndex) is set to 52. The electronic device 101 may transmit a random access preamble in a PRACH resource and at a time corresponding to the value illustrated in Table 5 above. The base station 401 may determine that transmission of the random access preamble is transmission of a specific SI request by identifying the time when the random access preamble is transmitted.

Figure 7:
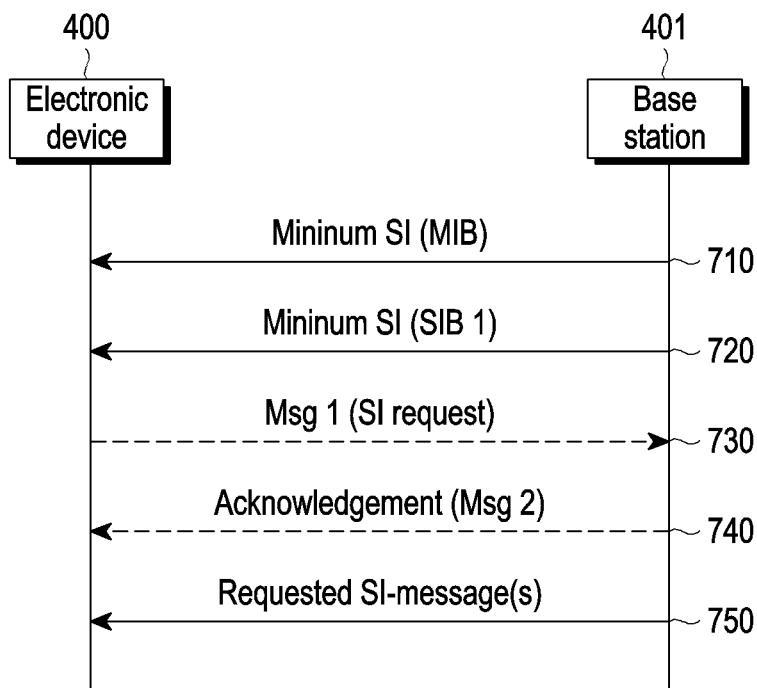
FIG. 7 is a signal flow diagram illustrating an example method for receiving system information from a base station by an electronic device according to various embodiments.
Figure 8:
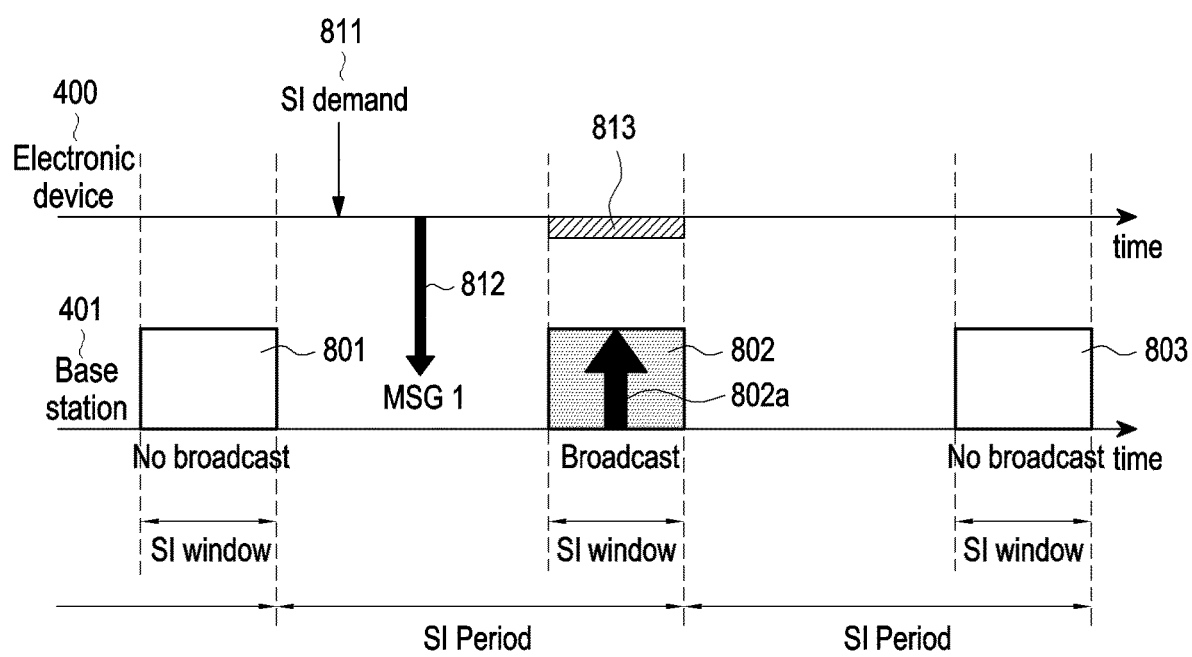
FIG. 8 is a diagram illustrating example timing of transmitting system information from a base station according to various embodiments.

FIG. 7 is a signal flow diagram illustrating an example method for receiving system information from a base station by an electronic device according to various embodiments. FIG. 8 is a diagram illustrating example timing of transmitting system information from a base station according to various embodiments. Referring to FIGS. 7 and 8, an electronic device 400 (user equipment (UE)) (e.g., the electronic device 101 of FIG. 1) may receive and decodes an MIB from a base station 401 (e.g., gNB) in operation 710. The electronic device 400 may receive and decode SIB1 with reference to information included in the received MIB in operation 720. If it is identified that there is an SIB not periodically broadcast by referring to the information included in the received SIB1 and that there is an RA resource corresponding to the SI, the electronic device 400 may transmit an SI request to the base station 401 by transmitting message 1 (Msg1) among the messages included in the random access procedure in operation 730.

According to various embodiments, referring to FIG. 8, the SIB configured not to be broadcast by the base station 401 may not be repeatedly broadcast every SI period. For example, the base station 401 may not transmit SI or an SIB within the first SI window 801 in a first SI period and may not transmit SI or an SIB within a third SI window 803 in a third SI period. According to various embodiments, when the electronic device 400 identifies at least one SIB configured not to be broadcast after decoding SIB1, the electronic device 400 may identify the RA resource corresponding to the corresponding SIB or SI using the information included in Table 4 above. The electronic device may transmit a random access preamble, which is message 1 (Msg1), to the base station 401 in a time interval set based on the identified RA resource. Upon receiving the random access preamble, the base station 401 may determine transmission of the SI request by identifying the time interval corresponding to the random access preamble. The base station 401 may transmit an RAR, as message 2 (Msg2), to the electronic device 400 in response to reception of the random access preamble in operation 740 and, in operation 750, the base station 401 may transmit a corresponding SI message to the electronic device 400 according to the transmitted SI request.

For example, referring to FIG. 8, the electronic device may identify at least one SIB configured not to be broadcast through SIB1, and at least one processor (e.g., the processor 120, the first communication processor 212, the second communication processor 214, or the integrated communication processor 260) in the electronic device 400 may determine that a demand 811 for the SI has occurred. According to various embodiments, the electronic device 400 may store the SIB1 message first received and, when the SI configuration information is then changed, determine that the demand for the SI has occurred. According to various embodiments, when identifying that the version of at least one SIB currently stored is invalid, the electronic device 400 may determine that the demand for SI has occurred. The electronic device 400 may identify the random access occasion configured for the SI by referring to SIB1 as described above, according to the demand 811 for the SI. The electronic device 400 may transmit, to the base station 401, message 1 (Msg1) 812 included in the random access procedure in the time interval corresponding to the identified random access occasion. Upon receiving message 1 812, the base station 401 may determine that transmission of message 1 812 is a request for specific SI or SIB and transmit the corresponding SI or SIB 802a to the electronic device 400 in the configured SI window 802. According to various embodiments, the corresponding SI or SIB 802a transmitted in the configured SI window 802 may be SI or SIB requested from another electronic device positioned in the same cell as the electronic device 400.

The electronic device 400, which has transmitted the SI request through message 1 812, may receive message 2 from the base station 401 and monitor (813) corresponding SI or a corresponding SIB 802a transmitted through the first arriving SI window 802 or the SI window 802 in the corresponding SI period. If decoding the corresponding SIB 802a fails as a result of the monitoring (e.g., when decoding of the corresponding SIB fails), the electronic device 400 may monitor the SI window 803 in the next SI period. When another electronic device in the cell transmits an SI request for the SI window 803 within the next SI period, the electronic device 400 may receive the corresponding SI or SIB by monitoring the SI window 803 in the next SI period.

Figure 9:
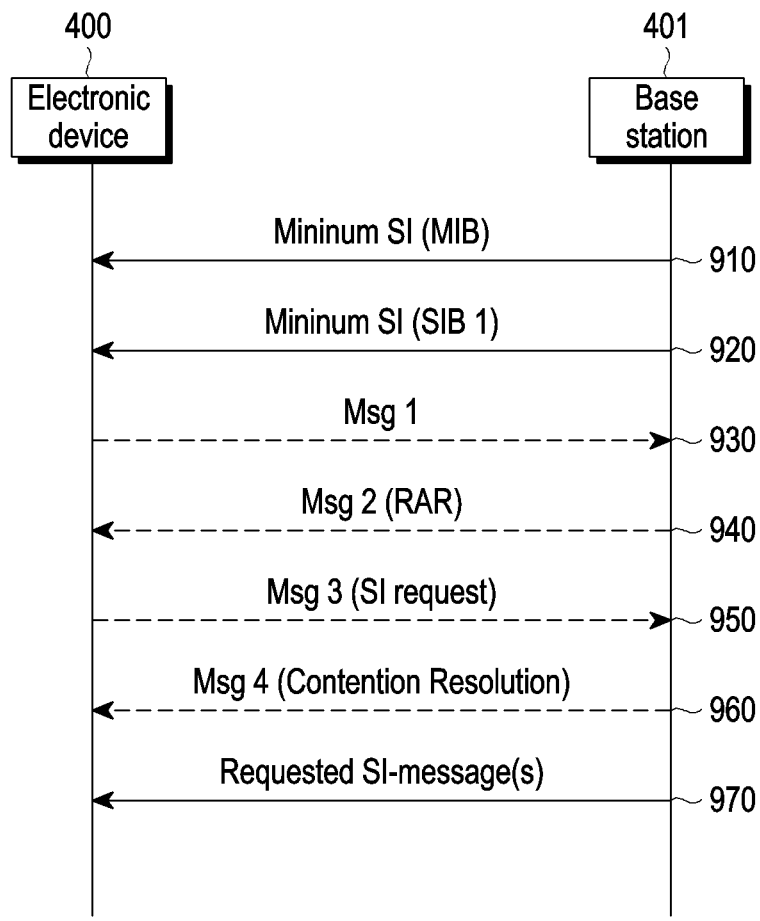
FIG. 9 is a signal flow diagram illustrating an example method for receiving system information from a base station by an electronic device according to various embodiments.
Figure 10:
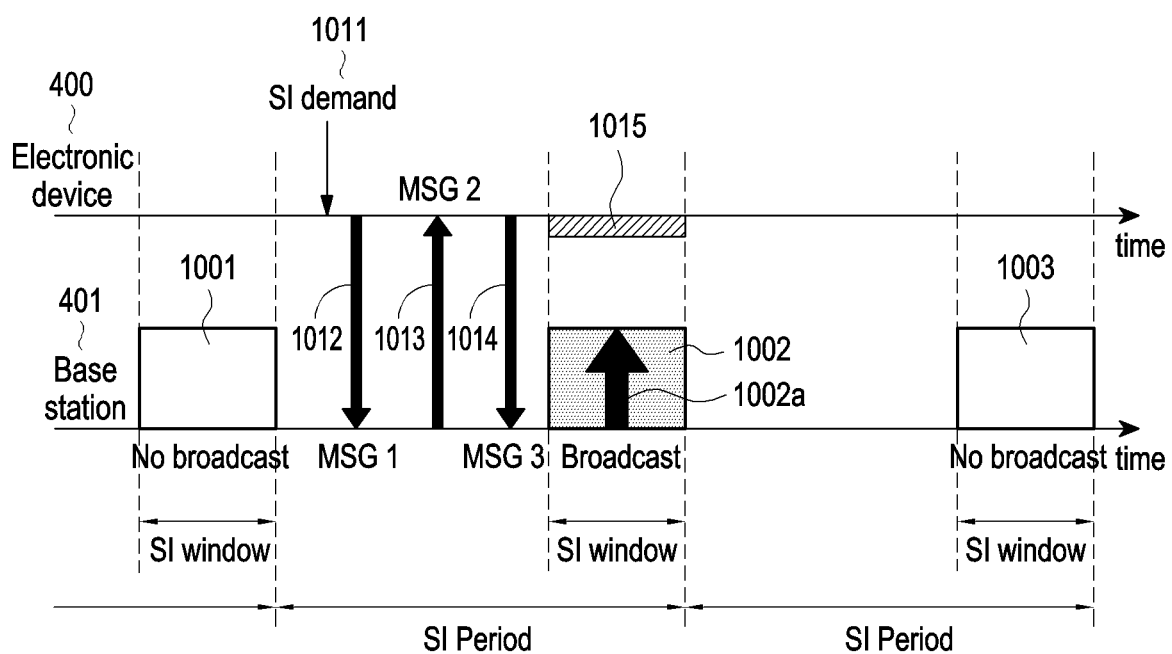
FIG. 10 is a diagram illustrating example timing of transmitting system information from a base station according to various embodiments.

FIG. 9 is a signal flow diagram illustrating an example method for receiving system information from a base station by an electronic device according to various embodiments. FIG. 10 is a diagram illustrating example timing of transmitting system information from a base station according to various embodiments. Referring to FIGS. 9 and 10, an electronic device 400 (user equipment (UE)) (e.g., the electronic device 101 of FIG. 1) may receive and decodes an MIB from a base station 401 (e.g., gNB) in operation 910. The electronic device 400 may receive and decode SIB1 with reference to information included in the received MIB in operation 920. If it is identified that there is an SIB not periodically broadcast by referring to the information included in the received SIB1 and that there is no RA resource corresponding to the SI, the electronic device 400 may transmit message 1 (Msg1) among the messages included in the random access procedure in operation 930. In operation 940, the base station 401 may transmit message 2 (Msg2), as an RAR, to the electronic device 400 in response to the reception of message 1. According to various embodiments, the electronic device 400 may transmit an SI request to the electronic device through message 3 (Msg3) in operation 950. For example, the electronic device 400 may transmit, to the base station 401, the SI request message in operation 950, using the UL-SCH resource allocated by the RAR from the base station 401 in operation 940. In operation 960, the base station 401 may transmit message 4 (Msg4) to the electronic device in response to the reception of message 3. The base station 401 may identify the SI request transmitted through message 3 and may transmit a corresponding SI message to the electronic device 400 according to the transmitted SI request in operation 970.

According to various embodiments, when the electronic device 400 and the base station 401 transmit/receive a message based on a 2-step random access procedure, the electronic device 400 may transmit a "message A preamble" instead of message 1 and, before receiving message 2, transmit a "message A payload" corresponding to message 3 through a physical uplink shared channel (PUSCH). According to various embodiments, the electronic device 400 may transmit an SI request through the message A payload. The base station 401 may identify the SI request by decoding the message A payload transmitted from the electronic device 400. The base station 401 may transmit the corresponding SI or SIB within a configured SI window in response to the SI request.

According to various embodiments, referring to FIG. 10, the SIB configured not to be broadcast by the base station 401 may not be repeatedly broadcast every SI period. For example, the base station 401 may not transmit SI or an SIB within the first SI window 1001 in a first SI period and may not transmit SI or an SIB within a third SI window 1003 in a third SI period. According to various embodiments, when the electronic device 400 identifies at least one SIB configured not to be broadcast after decoding SIB1, the electronic device 400 may identify whether SIB1 includes an RA resource for the corresponding SIB. As a result of the identification, if no RA resource exists, the electronic device may transmit an SI request using message 3.

For example, referring to FIG. 10, the electronic device may identify at least one SIB configured not to be broadcast through SIB1, and at least one processor (e.g., the processor 120, the first communication processor 212, the second communication processor 214, or the integrated communication processor 260) in the electronic device 400 may determine that a demand 1011 for the SI has occurred. According to various embodiments, the electronic device 400 may store the SIB1 message first received and, when the SI configuration information is then changed, determine that the demand for the SI has occurred. According to various embodiments, when identifying that the version of at least one SIB currently stored is invalid, the electronic device 400 may determine that the demand for SI has occurred. The electronic device 400 may transmit message 1 1012 to the base station 401 according to the demand 1011 for the SI as described above and may receive message 2 1013 from base station 401. The electronic device 400 may transmit message 3 1014 through the UL-SCH allocated to the electronic device 400 through message 2 1013. For example, the electronic device 400 may transmit an SI request message to the base station through the allocated UL-SCH. The SI request message may be included in an RRC system information request message (RRCSsystemInfoRequest). Upon receiving message 3 1014, the base station 401 may identify the SI request message of message 3 1014 and transmit the corresponding SI or SIB 1002a to the electronic device 400 in the configured SI window 1002. According to various embodiments, the corresponding SI or SIB 1002a transmitted in the configured SI window 1002 may be SI or SIB requested from another electronic device positioned in the same cell as the electronic device 400.

The electronic device 400, which has transmitted the SI request through message 3 1014, may receive message 4 from the base station 401 and monitor (1015) corresponding SI or a corresponding SIB 1002a transmitted through the first arriving SI window 1002 or the SI window 1002 in the corresponding SI period. If decoding the corresponding SIB 1002a fails as a result of the monitoring (e.g., when decoding of the corresponding SIB fails), the electronic device 400 may monitor the SI window 1003 in the next SI period. When another electronic device in the cell transmits an SI request for the SI window 1003 within the next SI period, the electronic device 400 may receive the corresponding SI or SIB by monitoring the SI window 1003 in the next SI period.

Hereinafter, methods for retransmitting an SI request when an SI request fails in the electronic device 101 according to various embodiments are described in greater detail below with reference to FIGS. 11 to 16. In the following embodiments, SI request failure may include when the base station fails to normally receive an SI request transmitted from the electronic device and may include when, although the SI request is normally transmitted (e.g., although normally receiving a response message (e.g., message 2 according to the random access procedure) in response to transmission of the SI request from the base station 401), the electronic device fails to obtain the corresponding SIB within the configured SI window (e.g., when failing to decode the corresponding SIB). When the electronic device fails to identify the SIB due to the SI request failure, normal communication between the electronic device and the network may be difficult. For example, when SIB2, SIB3, SIB4, and SIB5 are set as on-demand SI, and the SI request of the corresponding SIBs fails, the electronic device may operate in a state in which information related to cell reselection cannot be stored, causing paging missing or call failure. As another example, when SIB9 is set as on-demand SI, and the SI request of the corresponding SIB fails, GPS time information may not be obtained, so that the relevant application may malfunction.

In various embodiments described below, upon SI request failure for the SIB set as on-demand SI, it is possible to address issues that arise due to failure to obtain the SIB, by optimizing the SI request retransmission operation.

Figure 11:
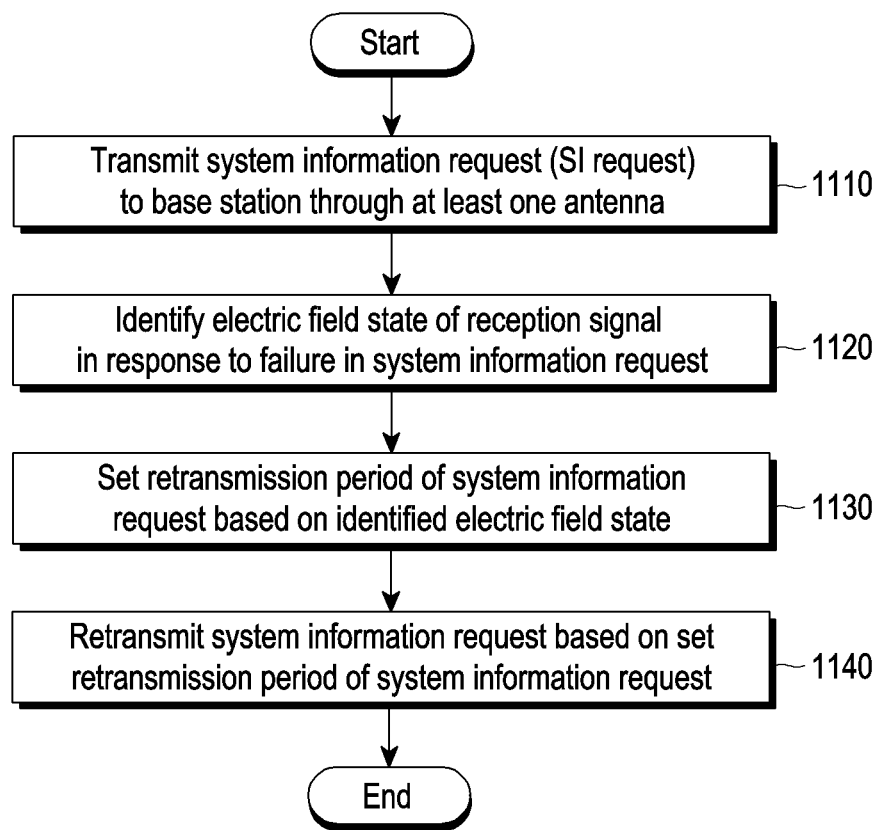
FIG. 11 is a flowchart illustrating an example method for retransmitting a system information request by an electronic device according to various embodiments.

FIG. 11 is a flowchart illustrating an example method for retransmitting a system information request by an electronic device according to various embodiments. Referring to FIG. 11, according to various embodiments, when at least one SIB is set as a non-broadcast SIB, an electronic device (e.g., the electronic device 101 of FIG. 1) (e.g., the wireless communication module 192, the first communication processor 212, the second communication processor 214, or the integrated communication processor 260) may transmit a system information request (e.g., an SI request) for the corresponding SIB to the base station through at least one antenna in operation 1110. The setting of whether to broadcast the SIB may be identified through SIB1 as described above. According to various embodiments, the system information may be requested through a dedicated message (e.g., a "DedicatedSIBRequest" message included in the standard document 3GPP TS 38.331) as in operation 312 of FIG. 3, may be requested by message 1 included in the random access procedure as in operation 318, or may be requested by message 3 included in the random access procedure as in operation 316.

According to various embodiments, the electronic device may identify the electric field state of the reception signal in response to the failure of the system information request in operation 1120. SI request failure may include when the base station fails to normally receive an SI request transmitted from the electronic device and may include when, although the SI request is normally transmitted, the electronic device fails to obtain the corresponding SIB within the SI window (e.g., when failing to decode the corresponding SIB). According to various embodiments, the electronic device may identify it based on the reference signal received power (RSRP) of the reception signal received by the electronic device or based on the number of times of decoding failure of the reception signal.

According to various embodiments, the electronic device may set a retransmission period of the system information request based on the identified electric field state of the reception signal in operation 1130. For example, the retransmission period when the RSRP is a set threshold or more according to the identification of the electric field state may be set to a value larger than the retransmission period when the RSRP is less than the set threshold. According to various embodiments, if the RSRP is larger than or equal to a first threshold (e.g., −100 dBm) according to the identification of the electric field state, the retransmission period may be set based on the transmission period of the system information and the paging discontinuous reception (DRX) period. For example, when the RSRP is equal to or larger than the first threshold, the electronic device may determine the current electric field state as a strong electric field. In the case of a strong electric field, it is not the stage to consider cell reselection but, for a better performance, it may be needed to obtain cell information with higher priority. According to various embodiments, since transmission of an SI request requires unnecessary wakeup by transmission of a RACH message, the retransmission period may be set to be relatively long. For example, the retransmission period of the system information request in the strong electric field may be set to a minimum common multiple of the paging DRX period and transmission period of the system information.

According to various embodiments, if the RSRP is less than the first threshold (e.g., −100 dBm) and exceeds a second threshold (e.g., −115 dBm) according to the identification of the electric field state, the retransmission period may be set to an integer multiple of the transmission period of the system information. For example, when the RSRP is less than the first threshold and exceeds the second threshold, the electronic device may determine the current electric field state as a medium electric field. In the medium electric field, if a neighbor cell, such as of intra frequency/inter frequency/inter RAT, is better, cell reselection needs to be considered. Thus, the retransmission period may be set to be relatively shorter than in the strong electric field.

For example, if the RSRP is not more than the second threshold (e.g., −115 dBm) according to the identification of the electric field state, the retransmission period may be set to be equal to the transmission period of the system information. According to various embodiments, when PDCCH decoding failure continuously occurs a set number (e.g., two) of times or more according to the identification of the state, the retransmission period may be set to be identical to the transmission period of the system information. According to various embodiments, if the block error rate (BLER) is a set value or more according to the identification of the state, the retransmission period may be set to be identical to the transmission period of the system information. For example, when the RSRP is equal to or lower than the second threshold, the electronic device may determine the current electric field state as a weak electric field. In the weak electric field, paging missing may occur if staying in the current cell. Thus, the retransmission period may be set to be identical to the shortest SI period so as to quickly move to a better cell, and an SI request may be retransmitted every SI period.

For example, the paging DRX period and the SI period may be set as shown in Table 6 below.

TABLE 6 message c1 : systemInformationBlockType1 :
{
pcch-Config
{
defaultPagingCycle rf128,
nAndPagingFrameOffset halfT : 0,
ns one
}
si-BroadcastStatus notBroadcasting,
si-Periodicity rf32,
sib-MappingInfo
{
{
type sibType3,
valueTag 1

Referring to Table 6, the paging DRX period may be set to 1280 ms, as 128 radio frames (RF), and the SI period may be set to 320 ms, as 32 radio frames.

According to Table 6 above and the above-described embodiments, in the strong electric field (e.g., when the RSRP is the first threshold or more), the retransmission period may be set to 1280 ms which is the least common multiple of the paging DRX period and the SI period. In the medium electric field (e.g., when the RSRP is less than the first threshold and more than the second threshold), the retransmission period may be set to 640 ms which is an integer multiple (e.g., twice) of the SI period. In the weak electric field (e.g., when the RSRP is not more than the second threshold), the retransmission period may be set to 320 ms, like the SI period.

According to various embodiments, in operation 1140, the electronic device may retransmit the system information request based on the set system information request retransmission period. For example, when the system information request fails, if the set system information request retransmission period expires, the electronic device may retransmit the system information request.

Figure 12:
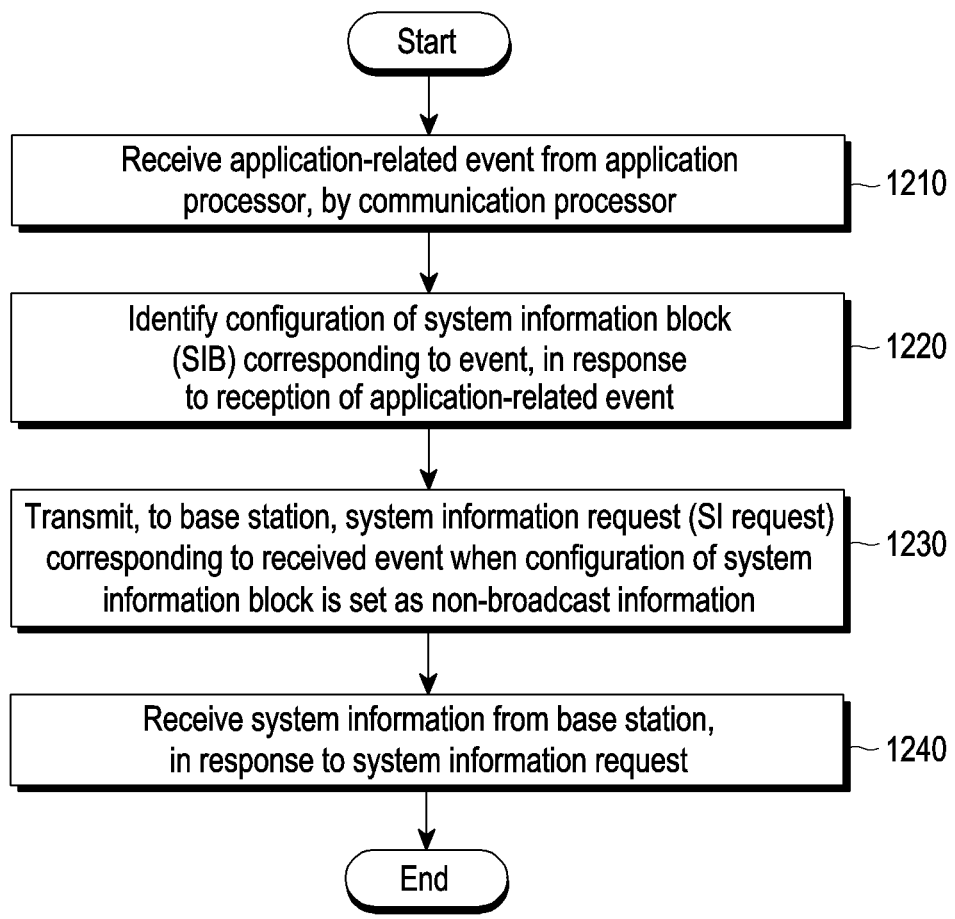
FIG. 12 is a flowchart illustrating an example method for identifying system information by an electronic device according to various embodiments.

FIG. 12 is a flowchart illustrating an example method for identifying system information by an electronic device according to various embodiments. Referring to FIG. 12, according to various embodiments, the electronic device (e.g., the electronic device 101 of FIG. 1) (e.g., the wireless communication module 192, the first communication processor 212, the second communication processor 214, or the integrated communication processor 260) may receive an event related to an application from an application processor (e.g., the processor 120 of FIG. 1) in operation 1210.

According to various embodiments, in operation 1220, the electronic device may identify a configuration of a system information block (SIB) corresponding to the event, in response to reception of the application-related event. For example, the application-related event may be an event of an MBMS service-related application, and a detailed example thereof is described below with reference to FIG. 16.

According to various embodiments, in operation 1230, when the configuration of the application-related system information block (e.g., SIB9 or SIB13) is set as non-broadcast information or when the corresponding system information block is not stored, the electronic device may transmit, to the base station, a system information request (SI request) corresponding to the received event.

According to various embodiments, in operation 1240, the electronic device may receive the system information (e.g., SIB9 or SIB13) from the base station, in response to the system information request.

Figure 13:
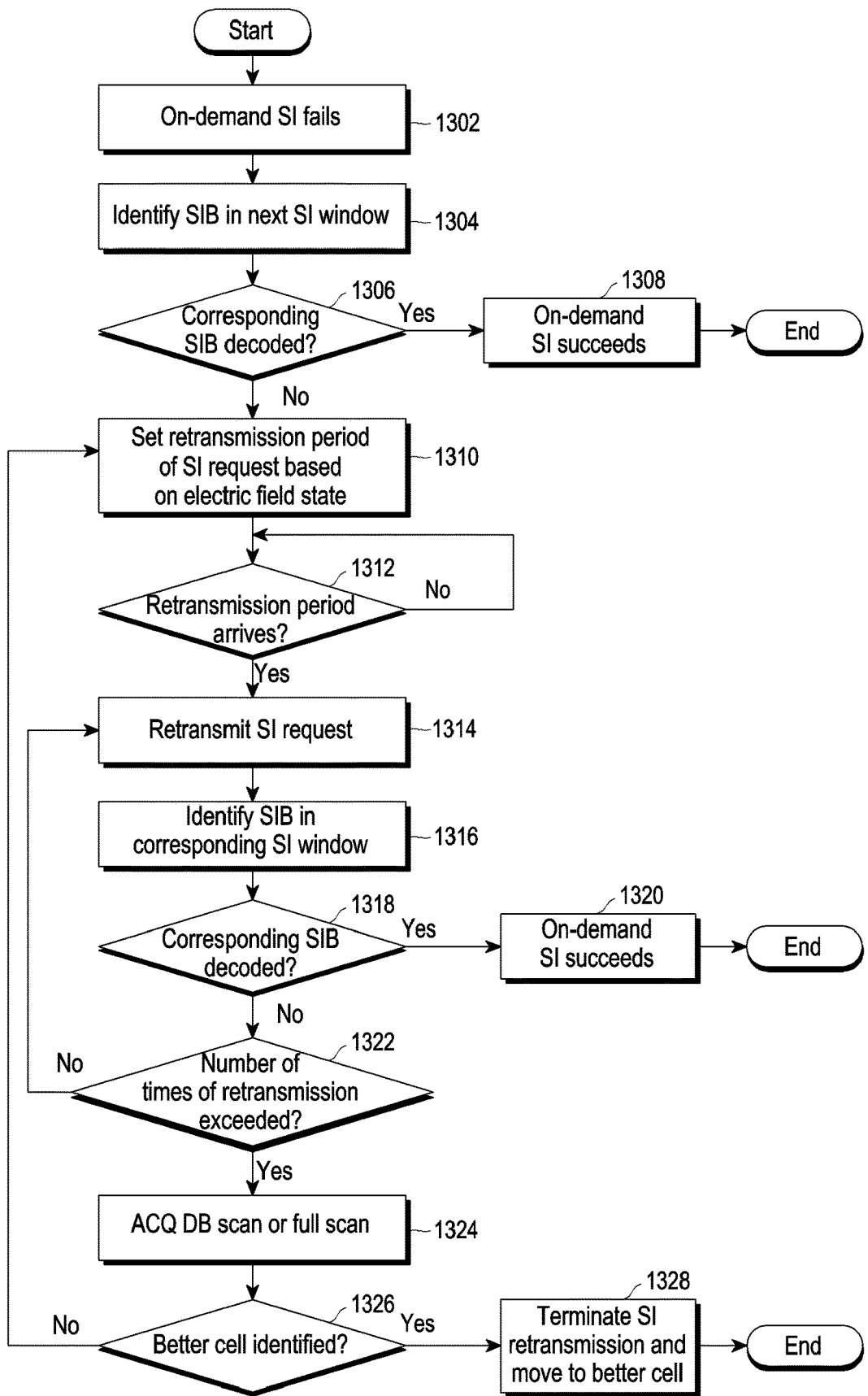
FIG. 13 is a flowchart illustrating an example method of operating an electronic device according to various embodiments.

FIG. 13 is a flowchart illustrating an example method of operating an electronic device according to various embodiments. Referring to FIG. 13, according to various embodiments, the electronic device (e.g., the electronic device 101 of FIG. 1) (e.g., the wireless communication module 192, the first communication processor 212, the second communication processor 214, or the integrated communication processor 260) may fail in SI request according to the on-demand scheme in operation 1302.

According to various embodiments, in operation 1304, the electronic device may identify an SIB in a next SI window. As a result of the identification, if the corresponding SIB is normally decoded (Yes in operation 1306) in operation 1306, the electronic device may process the on-demand SI as successful in operation 1308. For example, the electronic device may store the normally decoded SIB in the memory and use it. As a result of the identification, if the SIB is not normally decoded (No in operation 1306) in operation 1306, the electronic device may determine that the SI request fails and, in operation 1310, set an SI request retransmission period based on the electric field state as described above. Operation 1310 may be operated identical or similar to operation 1130 of FIG. 11 described above. According to various embodiments, operation 1304 and operation 1306 may be omitted. For example, if it is identified that the SI request according to the on-demand scheme has failed in operation 1302, the electronic device may set an SI request retransmission period based on the electric field state in operation 1310 without identifying the next SI window.

According to various embodiments, the electronic device may identify whether the set retransmission period of the SI request arrives in operation 1312. As a result of the identification, if the set retransmission period of the SI request does not arrive (No in operation 1312), the electronic device may wait until the retransmission period arrives. As a result of the identification, if the set retransmission period of the SI request arrives (Yes in operation 1312), the SI request may be retransmitted in operation 1314.

According to various embodiments, the electronic device may identify the SIB requested in the corresponding SI window (e.g., an upcoming SI window) according to the SI request retransmission in operation 1316. As a result of the identification, if the corresponding SIB is normally decoded (Yes in operation 1318) in operation 1318, the electronic device may process the on-demand SI as successful in operation 1320. As a result of the identification, if the SIB is not normally decoded (No in operation 1318) in operation 1318, the electronic device may determine that the SI request fails and, in operation 1322, identify whether the number of times of retransmission is exceeded.

According to various embodiments, as a result of the identification, if the number of times of retransmission is not exceeded (No in operation 1322), the electronic device may proceed to operation 1314 to retransmit the SI request. As a result of the identification, if the number of times of retransmission is exceeded (Yes in operation 1322), the electronic device may perform an acquisition (ACQ) database (DB) scan or a full scan operation in operation 1324. For example, the electronic device may first identify whether a cell stored in the ACQ DB exists around so that a service interruption does not occur due to the cell scan. If a better cell than the current cell is not identified as a result of the ACQ DB scan or full scan (No in operation 1326), the electronic device may proceed to operation 1310 to reset an SI retransmission period based on the current electric field state. If a better cell than the current cell is identified as a result of the ACQ DB scan or full scan (Yes in operation 1326), the electronic device may terminate the SI request retransmission and move to the identified better cell to start an attach procedure in operation 1328.

Figure 14:
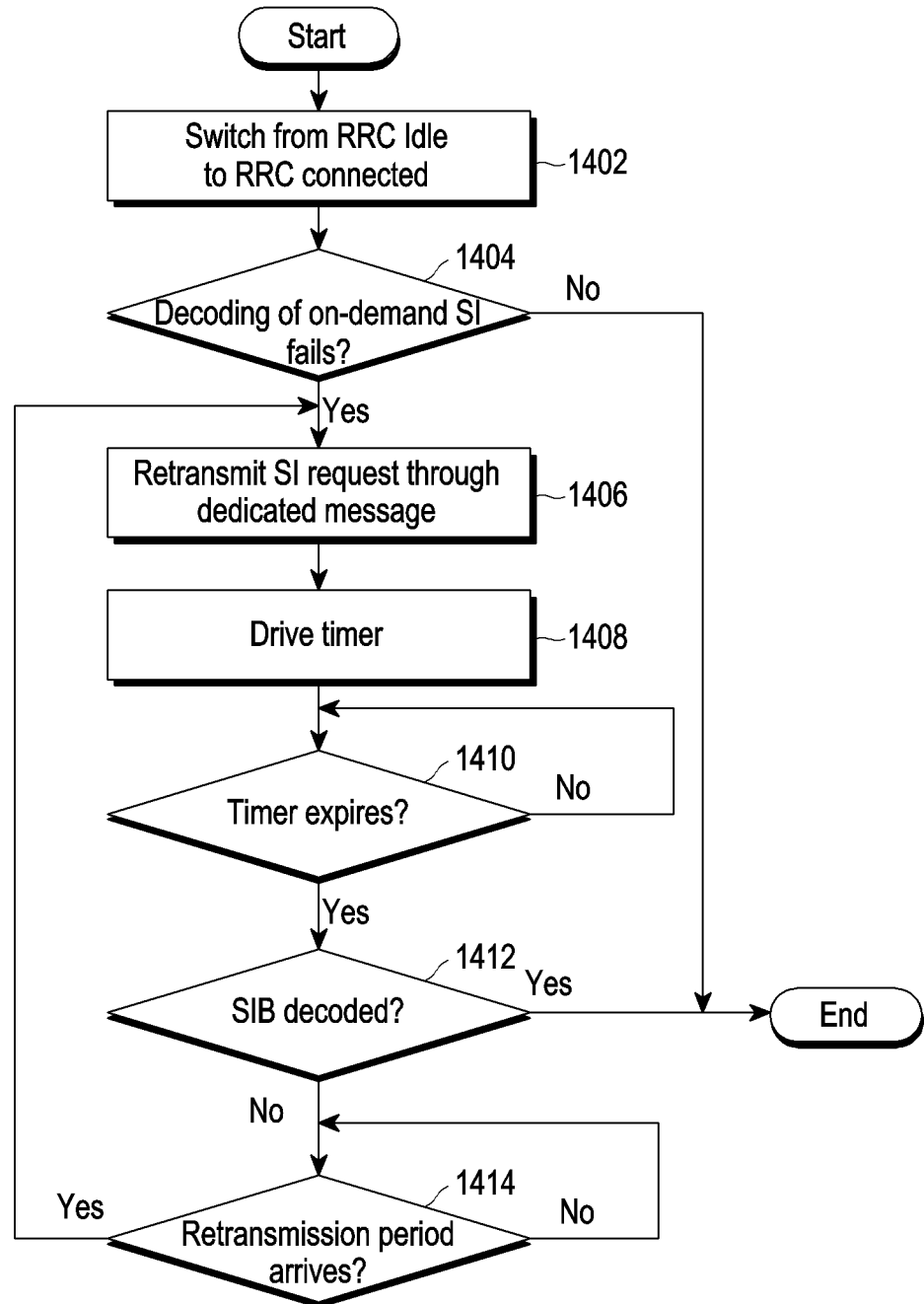
FIG. 14 is a flowchart illustrating an example method of operating an electronic device according to various embodiments.

FIG. 14 is a flowchart illustrating an example method of operating an electronic device according to various embodiments. Referring to FIG. 14, according to various embodiments, the electronic device (e.g., the electronic device 101 of FIG. 1) (e.g., the wireless communication module 192, the first communication processor 212, the second communication processor 214, or the integrated communication processor 260) may switch from the RRC_IDLE status to the RRC_CONNECTED status in operation 1402. According to various embodiments, operation 1402 may be replaced with a cell update operation or a tracking area update (TAU) operation by handover.

According to various embodiments, if SIB decoding according to the on-demand SI request does not fail in operation 1404 (No in operation 1404), the electronic device may normally identify the corresponding SIB. If the SIB decoding according to the on-demand SI request fails in operation 1404 (Yes in operation 1404), the electronic device may retransmit an SI request through a dedicated message (e.g., a "DedicatedSIBRequest" message included in the standard document 3GPP TS 38.331) and identify the SIB in the corresponding SI window according to the SI request in operation 1406. The electronic device may drive a timer in operation 1408 according to the retransmission of the SI request. According to various embodiments, the timer may be a T350 timer defined in 3GPP TS 38.331 and may be "onDemandSIB-RequestProhibitTimer".

According to various embodiments, the electronic device may identify whether the driven timer has expired in operation 1410. As a result of the identification, if the timer has not expired (No in operation 1410), it may wait until the timer expires. As a result of the identification, if the timer expires (Yes in operation 1410), it may identify whether the SIB is normally decoded in operation 1412. If SIB decoding according to the on-demand SI request is successful in operation 1412 (Yes in operation 1412), the corresponding SIB may be normally identified.

According to various embodiments, if SIB decoding according to the on-demand SI request fails in operation 1412 (No in operation 1412), in operation 1414, the electronic device may identify whether the set retransmission period of the SI request has arrived. According to various embodiments, the retransmission period may be set as in operation 1130 of FIG. 11. As a result of the identification, if the set retransmission period of the SI request does not arrive (No in operation 1414), the electronic device may wait until the retransmission period arrives. As a result of the identification, if the set retransmission period of the SI request arrives (Yes in operation 1414), the SI request may be retransmitted through a dedicated message in operation 1406.

Figure 15:
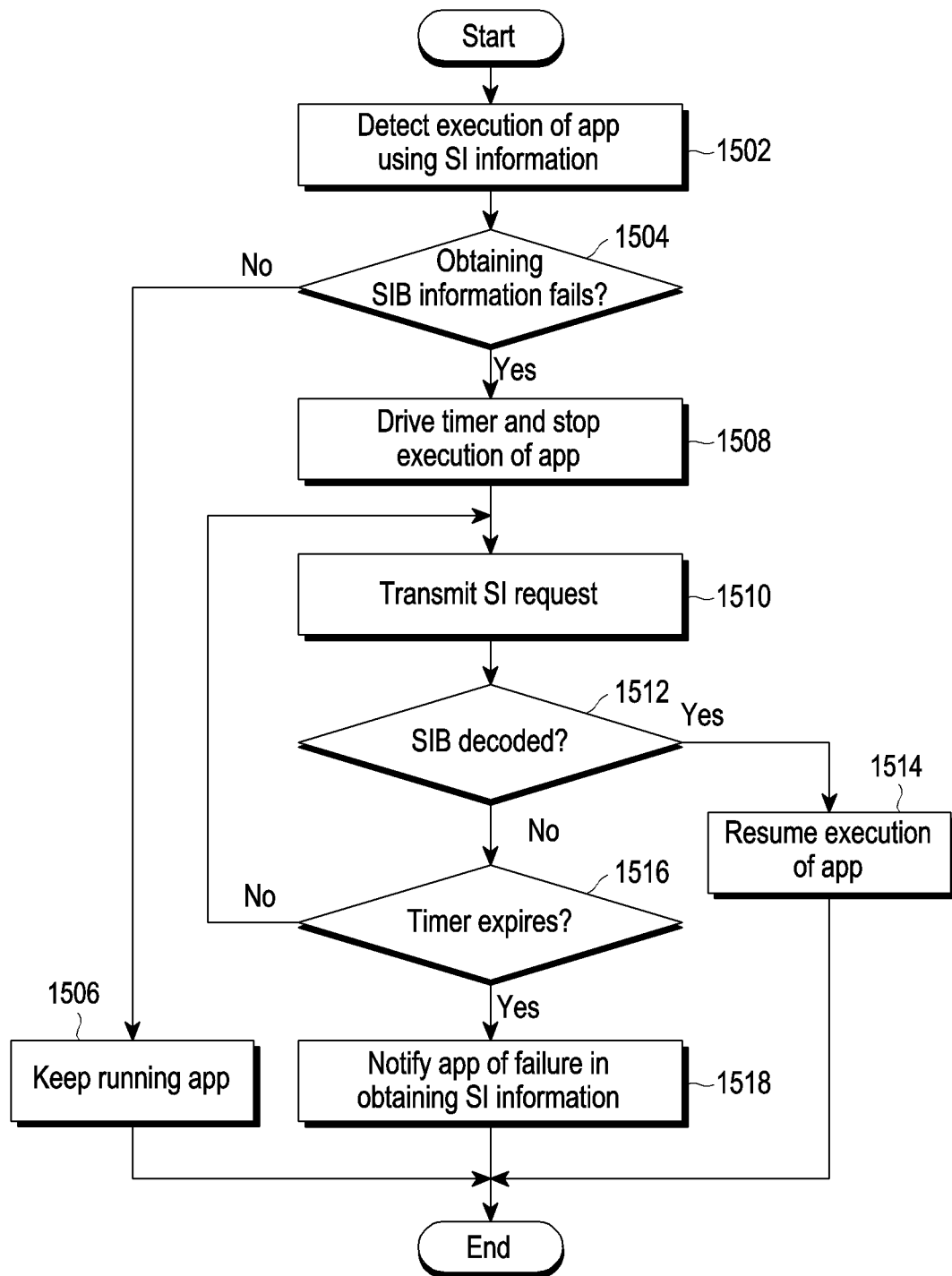
FIG. 15 is a flowchart illustrating an example method of operating an electronic device according to various embodiments.

FIG. 15 is a flowchart illustrating an example method of operating an electronic device according to various embodiments. Referring to FIG. 15, according to various embodiments, the electronic device (e.g., the electronic device 101 of FIG. 1) (e.g., the wireless communication module 192, the first communication processor 212, the second communication processor 214, or the integrated communication processor 260) may detect execution of an app (application) using SI information (e.g., SIB) in operation 1502. For example, the communication processor (e.g., the wireless communication module 192, the first communication processor 212, the second communication processor 214, or the integrated communication processor 260) may receive an event related to an application from an application processor (e.g., the processor 120 of FIG. 1). According to various embodiments, the communication processor may detect execution of the app using the SI information by identifying the configuration of the system information block (SIB) corresponding to the event, in response to reception of the application-related event.

According to various embodiments, if obtaining the SIB information does not fail in operation 1504 (No in operation 1504), the electronic device may identify the SIB as normal and keep running the app in operation 1506. If obtaining the SIB information fails in operation 1504 (Yes in operation 1504) (e.g., when the SIB referenced by the app is set as on-demand SI but the corresponding SIB message is not yet obtained), the electronic device may drive the timer (e.g., an on-demand SI wait timer) and temporarily stop execution of the app in operation 1508. The timer may be set considering the delay time and operation time of the app. For example, the timer may be set to an integer multiple (e.g., 1280 ms) of the SI period.

According to various embodiments, in operation 1510, the electronic device may transmit an SI request. For example, when the electronic device is currently in the RRC_IDLE status or RRC_INACTIVE status, and the app does not entail data transmission/reception operation, the SI request may be transmitted through the random access message, and the SI may be identified in the next SI window as described above. According to an embodiment, when the electronic device is currently in the RRC_CONNECTED status or the app entails a data transmission/reception operation, the SI request may be transmitted through a dedicated message (e.g., "DedicatedSIBRequest message) in the RRC_CONNECTED status, and the corresponding SI may be identified.

The electronic device may identify whether the corresponding SIB is normally decoded according to the SI request transmission in operation 1512. As a result of the identification in operation 1512, if the corresponding SIB is normally decoded (Yes in operation 1512), execution of the temporarily stopped app may be resumed (1514). For example, the identified corresponding SIB may be used through the execution of the app.

According to various embodiments, as a result of the identification in operation 1512, if it is determined that the SIB request has failed because the corresponding SIB is not normally decoded (No in operation 1512), the electronic device may identify whether the driven timer has expired in operation 1516. As a result of the identification, if the timer has not expired (No in operation 1516), the SI request may be retransmitted. As a result of the identification, if the timer expires (Yes in operation 1516), the electronic device may notify the app of failure in obtaining the SI information in operation 1518. The corresponding app may identify the failure to obtain the SI information and terminate execution of the corresponding app. According to various embodiments, as obtaining the SI information fails, the electronic device may display a message related to the failure in obtaining the SI information on a display (e.g., the display module 160 of FIG. 1).

Figure 16:
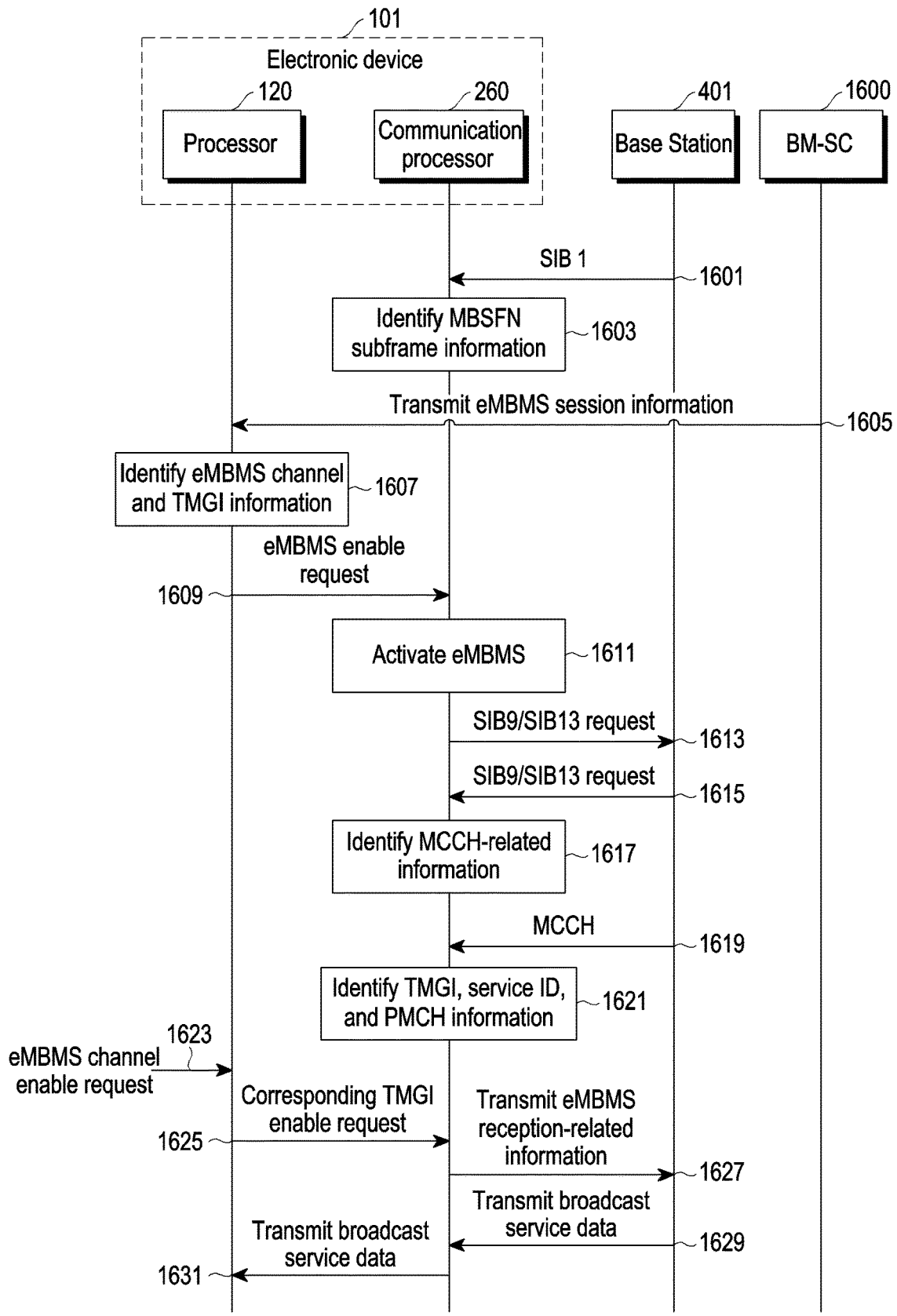
FIG. 16 is a signal flow diagram illustrating an example method of operating an electronic device according to various embodiments.

FIG. 16 is a signal flow diagram illustrating an example method of operating an electronic device according to various embodiments. Referring to FIG. 16, according to various embodiments, the electronic device 101 (e.g., the communication processor 260 of the electronic device) may receive SIB 1 from the base station 401 (e.g., gNB) in operation 1601. The communication processor 260 of the electronic device 101 may identify MBSFN subframe information (e.g., information about the period and number of the MBSFN subframe configured in the base station) from SIB1 received from the base station 401 in operation 1603. SIB1 may be received by both an electronic device supporting a broadcast service and an electronic device supporting no broadcast service.

According to various embodiments, the processor 120 (e.g., middleware of an application processor (AP)) of the electronic device 101 may receive eMBMS session information (e.g., eMBMS channel information and temporary mobile group identity (TMGI) information corresponding to the channel information) from the BM-SC 1600 (e.g., an eMBMS server) in operation 1605. The processor 120 may identify the eMBMS channel information and TMGI information corresponding to the channel information from the information received from the BM-SC 1600 in operation 1607. According to various embodiments, the electronic device that does not support the eMBMS may omit at least some of operation 1605 and its subsequent steps. For example, operation 1605 may be omitted for the electronic device that does not support the eMBMS.

According to various embodiments, in operation 1609, the processor 120 of the electronic device 101 may transmit an eMBMS service enable request (e.g., an enable command) to execute the eMBMS operation to the communication processor 260 as an eMBMS service is needed, in operation 1609. According to various embodiments, the communication processor 260 of the electronic device 101 may operate basically in the eMBMS service disable state after the electronic device 101 boots up and, after receiving an eMBMS service enable request transferred by the processor 120, switch to the eMBMS service enable state to perform an eMBMS service-related operation in operation 1611.

According to various embodiments, the communication processor 260 may identify at least one SIB (e.g., SIB9 and/or SIB13) required according to the eMBMS service-related operation. Although FIG. 16 illustrates an example of SIB9 and/or SIB13 as the eMBMS service-related SIB, the number of the SIB may be changed, and other related SIBs may be added. For example, the electronic device may identify that at least one SIB required according to the service is an SIB configured not to be broadcast through SIB1 and determine that a demand for the corresponding SI has occurred. According to various embodiments, the electronic device may transmit an SI request for the corresponding SIB (e.g., SIB9 and/or SIB13) in operation 1613, according to the demand for the SI. For example, when the electronic device is currently in the RRC_IDLE status or RRC_INACTIVE status, and the eMBMS service does not entail data transmission/reception operation, the SI request may be transmitted through the random access message, and the SI may be identified in the next SI window as described above. According to an embodiment, when the electronic device is currently in the RRC_CONNECTED status or the eMBMS service entails a data transmission/reception operation, the SI request may be transmitted through a dedicated message (e.g., "DedicatedSIBRequest message) in the RRC_CONNECTED status, and the corresponding SI may be identified.

In operation 1615, the electronic device 101 may identify SIB9 and/or SIB13 transmitted from the base station 401 through the corresponding SI window according to the SI request and, in operation 1617, identify multicast control channel (MCCH)-related information (e.g., GPS time information or information for receiving the MCCH) through the received SIB9 and/or SIB13.

According to various embodiments, in operation 1619, the communication processor 260 may receive the MCCH based on the SIB13 received in operation 1615. The MCCH may include MBSFN subframe-related information (e.g., MBSFNAreaConfiguration message).

According to various embodiments, in operation 1621, the communication processor 260 may receive a service ID and PMCH information corresponding to the TMGI information received from the processor 120 through the received MCCH. According to various embodiments, the communication processor may identify a subframe corresponding to the service ID among MBSFN subframes configured through the received PMCH information.

According to various embodiments, when the user who wants to watch a broadcast of a specific channel inputs (e.g., touches) to the interface (e.g., the display device 160 of FIG. 1) of the electronic device 101 and selects a specific broadcast channel, the processor 120 may receive the user input as the selected eMBMS channel enable request in operation 1623. According to various embodiments, in response to receiving the eMBMS channel enable request from the user, in operation 1625, the processor 120 (e.g., middleware of the application processor) may request the communication processor 260 to activate the TMGI corresponding to the selected eMBMS channel. According to various embodiments, in operation 1627, the communication processor 260 may transmit, to the base station 401, channel information receiving eMBMS data (e.g., broadcast channel information corresponding to the PMCH or frequency information corresponding to the broadcast channel) through an MBMSInterestIndication message. The base station 401 may receive channel information for receiving the eMBMS data and may identify that the electronic device 401 is receiving eMBMS data. According to various embodiments, the communication processor 260 may notify the base station 401 that the eMBMS data is not received through the MBMSInterestIndication message even when the eMBMS data is no longer received.

According to various embodiments, in operation 1629, the communication processor 260 may receive the eMBMS data through the PMCH corresponding to the TMGI requested by the processor 120 from the base station 401. In operation 1631, the communication processor 260 may transfer the eMBMS data received from the base station 401 to the processor 120. According to various embodiments, the electronic device 101 may receive the eMBMS data only in the MBSFN subframe corresponding to the TMGI corresponding to the broadcast channel requested by the user.

According to various example embodiments, an electronic device may comprise: at least one antenna (e.g., the first antenna module 242, the second antenna module 244, or the third antenna module 246) and a communication processor (e.g., the wireless communication module 192, the first communication processor 212, the second communication processor 214, or the integrated communication processor 260). The communication processor may be configured to: transmit a system information request to a base station through the at least one antenna, identify an electric field state of a reception signal, in response to a failure in the system information request, set a retransmission period of the system information request based on the identified electric field state of the reception signal, and retransmit the system information request based on the set retransmission period of the system information request.

According to various example embodiments, the communication processor may identify information broadcast from the base station and identify that the system information is set as information being transmitted by a request based on the broadcast information.

According to various example embodiments, the electric field state may be identified by a reference signal received power (RSRP) of the reception signal.

According to various example embodiments, the communication processor may be configured to set the retransmission period based on a paging discontinuous reception (DRX) period and a transmission period of the system information based on the RSRP being a first threshold or more.

According to various example embodiments, the communication processor may be configured to: set the retransmission period to an integer multiple of the transmission period of the system information based on the RSRP being less than a first threshold and more than a second threshold, and set the retransmission period to the transmission period of the system information based on the RSRP being the second threshold or less.

According to various example embodiments, the communication processor may be configured to set the retransmission period based on the RSRP being a first threshold or more to be larger than the retransmission period based on the RSRP being less than the first threshold.

According to various example embodiments, the electric field state may be identified based on a number of failures in decoding the reception signal.

According to various example embodiments, the communication processor may be configured to request the system information by a random access-related message in a radio resource control (RRC) idle state.

According to various example embodiments, the communication processor may be configured to: identify information broadcast from the base station, identify random access-related information for transmitting the system information request included in the broadcast information, and request the system information by a random access preamble based on the identified random access-related information.

According to various example embodiments, an electronic device may comprise: a memory, at least one antenna, an application processor, and a communication processor. The communication processor may be configured to: receive an event related to an application from the application processor, identify a configuration of system information corresponding to the received event, in response to the reception of the application-related event, transmit a system information request corresponding to the received event to a base station through the antenna based on the system information corresponding to the received event being identified as set as non-broadcast information, and receive the system information from the base station in response to the transmission of the system information request.

According to various example embodiments, a method for operating an electronic device may comprise: transmitting a system information request to a base station through at least one antenna, identifying an electric field state of a reception signal, in response to a failure in the system information request, setting a retransmission period of the system information request based on the identified electric field state of the reception signal, and retransmitting the system information request based on the set retransmission period of the system information request.

According to various example embodiments, the method may further comprise: identifying information broadcast from the base station and identifying that the system information is set as information being transmitted by a request based on the broadcast information.

According to various example embodiments, the electric field state may be identified by a reference signal received power (RSRP) of the reception signal.

According to various example embodiments, the method may further comprise: setting the retransmission period based on a paging discontinuous reception (DRX) period and a transmission period of the system information based on the RSRP being a first threshold or more.

According to various example embodiments, the method may further comprise: setting the retransmission period to an integer multiple of the transmission period of the system information based on the RSRP being less than a first threshold and more than a second threshold, and setting the retransmission period to the transmission period of the system information based on the RSRP being the second threshold or less.

According to various example embodiments, the method may further comprise setting the retransmission period based on the RSRP being a first threshold or more to be larger than the retransmission period based on the RSRP being less than the first threshold.

According to various example embodiments, the electric field state may be identified based on a number of failures in decoding the reception signal.

According to various example embodiments, the method may further comprise requesting the system information by a random access-related message in a radio resource control (RRC) idle status.

According to various example embodiments, the method may further comprise: identifying information broadcast from the base station, identifying random access-related information for transmitting the system information request included in the broadcast information, and requesting the system information by a random access preamble based on the identified random access-related information.

According to various example embodiments, a method for operating an electronic device may comprise: receiving, by a communication processor, an event related to an application from an application processor, identifying a configuration of system information corresponding to the received event, in response to the reception of the application-related event, transmitting a system information request corresponding to the received event to a base station based on the system information corresponding to the received event being identified as set as non-broadcast information, and receiving the system information from the base station in response to the transmission of the system information request.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one antenna; and
   a communication processor configured to:
   transmit a system information request to a base station through the at least one antenna,
   in response to a failure in the system information request, identify an electric field state of a reception signal,
   set a retransmission period of the system information request based on the identified electric field state of the reception signal, and
   retransmit the system information request based on the set retransmission period of the system information request.

2. The electronic device of claim 1, wherein the communication processor is further configured to:
   identify information broadcast from the base station, and
   identify that the system information is set as information being transmitted by a request based on the broadcast information.

3. The electronic device of claim 1, wherein the electric field state is identified by a reference signal received power (RSRP) of the reception signal.

4. The electronic device of claim 3, wherein the communication processor is further configured to:
   set the retransmission period based on a paging discontinuous reception (DRX) period and a transmission period of the system information based on the RSRP being a first threshold or more.

5. The electronic device of claim 3, wherein the communication processor is further configured to:
   set the retransmission period to an integer multiple of the transmission period of the system information based on the RSRP being less than a first threshold and more than a second threshold, and
   set the retransmission period to the transmission period of the system information based on the RSRP being the second threshold or less.

6. The electronic device of claim 3, wherein the communication processor is further configured to:
   set the retransmission period based on the RSRP being a first threshold or more to be larger than the retransmission period based on the RSRP being less than the first threshold.

7. The electronic device of claim 1, wherein the electric field state is identified based on a number of failures in decoding the reception signal.

8. The electronic device of claim 1, wherein the communication processor is further configured to:
   request the system information by a random access-related message, in a radio resource control (RRC) idle state.

9. The electronic device of claim 8, wherein the communication processor is further configured to:
   identify information broadcast from the base station,
   identify random access-related information for transmitting the system information request included in the broadcast information, and
   request the system information by a random access preamble based on the identified random access-related information.

10. An electronic device comprising:
    a memory;
    at least one antenna;
    an application processor, and
    a communication processor configured to:
    receive an event related to an application from the application processor,
    in response to the reception of the application-related event, identify a configuration of system information corresponding to the received event,
    transmit a system information request corresponding to the received event to a base station through the antenna based on the system information corresponding to the received event being identified as set as non-broadcast information, and
    receive the system information from the base station in response to the transmission of the system information request.

11. A method of operating an electronic device, the method comprising:
    transmitting a system information request to a base station through at least one antenna;
    in response to a failure in the system information request, identifying an electric field state of a reception signal;
    setting a retransmission period of the system information request based on the identified electric field state of the reception signal; and
    retransmitting the system information request based on the set retransmission period of the system information request.

12. The method of claim 11, further comprising:
    identifying information broadcast from the base station; and
    identifying that the system information is set as information being transmitted by a request based on the broadcast information.

13. The method of claim 11, wherein the electric field state is identified by a reference signal received power (RSRP) of the reception signal.

14. The method of claim 13, further comprising setting the retransmission period based on a paging discontinuous reception (DRX) period and a transmission period of the system information based on the RSRP being a first threshold or more.

15. The method of claim 13, further comprising:
setting the retransmission period to an integer multiple of the transmission period of the system information based on the RSRP being less than a first threshold and more than a second threshold, and
setting the retransmission period to the transmission period of the system information based on the RSRP being the second threshold or less.

16. The method of claim 13, further comprising setting the retransmission period based on the RSRP being a first threshold or more to be larger than the retransmission period based on the RSRP being less than the first threshold.

17. The method of claim 11, wherein the electric field state is identified based on a number of failures in decoding the reception signal.

18. The method of claim 11, further comprising requesting the system information by a random access-related message, in a radio resource control (RRC) idle state.

19. The method of claim 18, further comprising:
identifying information broadcast from the base station;
identifying random access-related information for transmitting the system information request included in the broadcast information; and
requesting the system information by a random access preamble based on the identified random access-related information.

20. A method of operating an electronic device, the method comprising:
receiving, by a communication processor, an event related to an application from an application processor;
in response to the reception of the application-related event, identifying a configuration of system information corresponding to the received event;
transmitting a system information request corresponding to the received event to a base station based on the system information corresponding to the received event being identified as set as non-broadcast information; and
receiving the system information from the base station in response to the transmission of the system information request.

* * * * *